(12) United States Patent
Benson et al.

(10) Patent No.: US 12,293,424 B2
(45) Date of Patent: May 6, 2025

(54) SYSTEMS AND METHODS FOR DRILLING A WELL

(71) Applicant: MOTIVE DRILLING TECHNOLOGIES, INC., Dallas, TX (US)

(72) Inventors: Todd Benson, Dallas, TX (US); John Burkhart, Dallas, TX (US); Teddy C. Chen, Austin, TX (US)

(73) Assignee: MOTIVE DRILLING TECHNOLOGIES, INC., Dallas, TX (US)

( * ) Notice: Subject to any disclaimer, the term of this patent is extended or adjusted under 35 U.S.C. 154(b) by 0 days.

(21) Appl. No.: 18/734,583

(22) Filed: Jun. 5, 2024

(65) Prior Publication Data

US 2024/0362724 A1    Oct. 31, 2024

Related U.S. Application Data

(63) Continuation of application No. 18/452,249, filed on Aug. 18, 2023, now Pat. No. 12,056,777, which is a
(Continued)

(51) Int. Cl.
*E21B 7/10* (2006.01)
*E21B 7/00* (2006.01)
(Continued)

(52) U.S. Cl.
CPC ............... *G06Q 50/02* (2013.01); *E21B 7/00* (2013.01); *E21B 7/04* (2013.01); *E21B 41/00* (2013.01);
(Continued)

(58) Field of Classification Search
CPC ... E21B 7/04; E21B 7/10; E21B 44/00; E21B 44/02; E21B 44/005; E21B 45/00; E21B 7/046

See application file for complete search history.

(56) References Cited

U.S. PATENT DOCUMENTS

| 2,742,265 A | 4/1956 | Snyder |
| 3,761,701 A | 9/1973 | Wilder et al. |

(Continued)

FOREIGN PATENT DOCUMENTS

| CN | 1936263 A | 3/2007 |
| CN | 101936134 A | 1/2011 |

(Continued)

OTHER PUBLICATIONS

"Affidavit Of Nathaniel E Frank-White", Apr. 14, 2022, 9 pages.
(Continued)

*Primary Examiner* — Kipp C Wallace
(74) *Attorney, Agent, or Firm* — Kilpatrick Townsend & Stockton LLP

(57) ABSTRACT

A drilling system may have a drilling rig with a drill string including a BHA with a drill bit. The method may include determining a current BHA location and a future BHA location based on the current BHA location and a current trajectory of the BHA and comparing the future BHA location to a target drilling path. When the future BHA location is a predetermined distance from the target drilling path, then a plurality of geometric convergence paths may be generated, each providing a convergence solution from the current BHA location toward the target drilling path. The method may include determining (i) a distance to drill, (ii) an overall curvature, and (iii) a time required for drilling, of each of the geometric convergence paths and selecting a geometric convergence path responsive to the above. The wellbore may be drilled in accordance with the selected one of the plurality of geometric convergence paths.

25 Claims, 11 Drawing Sheets

Related U.S. Application Data continuation of application No. 17/449,707, filed on Oct. 1, 2021, now Pat. No. 12,051,122, which is a continuation of application No. 16/906,571, filed on Jun. 19, 2020, now Pat. No. 11,170,454, which is a continuation of application No. 15/836,563, filed on Dec. 8, 2017, now Pat. No. 10,726,506, which is a continuation of application No. 15/180,661, filed on Jun. 13, 2016, now Pat. No. 9,865,022, which is a continuation of application No. 14/660,298, filed on Mar. 17, 2015, now abandoned, which is a continuation of application No. 14/067,390, filed on Oct. 30, 2013, now Pat. No. 8,996,396.

(60) Provisional application No. 61/839,731, filed on Jun. 26, 2013.

(51) Int. Cl.
| | | |
|---|---|---|
| *E21B 7/04* | (2006.01) | |
| *E21B 41/00* | (2006.01) | |
| *E21B 44/00* | (2006.01) | |
| *G06Q 10/063* | (2023.01) | |
| *G06Q 10/0631* | (2023.01) | |
| *G06Q 10/0637* | (2023.01) | |
| *G06Q 50/02* | (2012.01) | |

(52) U.S. Cl.
CPC ..... *G06Q 10/063* (2013.01); *G06Q 10/06313* (2013.01); *G06Q 10/06375* (2013.01)

(56) References Cited

U.S. PATENT DOCUMENTS

| | | |
|---|---|---|
| 4,794,534 A | 12/1988 | Millheim |
| 5,193,628 A | 3/1993 | Hill, III et al. |
| 5,220,963 A | 6/1993 | Patton |
| 5,812,068 A | 9/1998 | Wisler et al. |
| 6,088,294 A | 7/2000 | Leggett, III et al. |
| 6,233,524 B1 | 5/2001 | Harrell et al. |
| 6,272,434 B1 | 8/2001 | Wisler et al. |
| 6,279,702 B1 | 8/2001 | Koh |
| 6,389,360 B1 | 5/2002 | Alft et al. |
| 6,408,953 B1 | 6/2002 | Goldman et al. |
| 6,424,919 B1 | 7/2002 | Moran et al. |
| 6,523,623 B1 | 2/2003 | Schuh |
| 6,549,879 B1 | 4/2003 | Cullick et al. |
| 6,577,954 B2 | 6/2003 | Alft et al. |
| 6,612,382 B2 | 9/2003 | King |
| 6,732,052 B2 | 5/2004 | Macdonald et al. |
| 6,749,029 B2 | 6/2004 | Alft et al. |
| 7,000,710 B1 | 2/2006 | Umbach |
| 7,003,439 B2 | 2/2006 | Aldred et al. |
| 7,011,156 B2 | 3/2006 | von Gynz-Rekowski |
| 7,032,689 B2 | 4/2006 | Goldman et al. |
| 7,054,750 B2 | 5/2006 | Rodney et al. |
| 7,085,696 B2 | 8/2006 | King |
| 7,136,795 B2 | 11/2006 | Downton |
| 7,142,986 B2 | 11/2006 | Moran |
| 7,342,504 B2 | 3/2008 | Crane et al. |
| 7,460,957 B2 | 12/2008 | Prange et al. |
| 7,596,481 B2 | 9/2009 | Zamora et al. |
| 7,606,666 B2 | 10/2009 | Repin et al. |
| 7,653,563 B2 | 1/2010 | Veeningen et al. |
| 7,684,929 B2 | 3/2010 | Prange et al. |
| 7,823,655 B2 | 11/2010 | Boone et al. |
| 7,860,593 B2 | 12/2010 | Boone |
| 7,913,773 B2 | 3/2011 | Li et al. |
| 7,938,197 B2 | 5/2011 | Boone et al. |
| 7,945,488 B2 | 5/2011 | Karr et al. |
| 8,010,290 B2 | 8/2011 | Illfelder |
| 8,210,283 B1 | 7/2012 | Benson et al. |
| 8,301,382 B2 | 10/2012 | Herrera |
| 8,463,549 B1 | 6/2013 | Selman et al. |
| 8,892,407 B2 | 11/2014 | Budiman et al. |
| 8,996,396 B2 | 3/2015 | Benson et al. |
| 9,091,773 B1 | 7/2015 | Selman et al. |
| 9,359,882 B2 | 6/2016 | Snyder |
| 9,865,022 B2 | 1/2018 | Benson et al. |
| 10,726,506 B2 | 7/2020 | Benson et al. |
| 11,170,454 B2 | 11/2021 | Benson et al. |
| 12,051,122 B2 | 7/2024 | Benson et al. |
| 12,056,777 B2 | 8/2024 | Benson et al. |
| 2001/0042642 A1 | 11/2001 | King |
| 2001/0054514 A1 | 12/2001 | Sullivan et al. |
| 2002/0103630 A1 | 8/2002 | Aldred et al. |
| 2002/0116348 A1 | 8/2002 | Phillips et al. |
| 2002/0139581 A1 | 10/2002 | Schultz et al. |
| 2003/0024738 A1 | 2/2003 | Schuh |
| 2004/0083058 A1 | 4/2004 | Ravi et al. |
| 2004/0168811 A1 | 9/2004 | Shaw et al. |
| 2004/0238222 A1 | 12/2004 | Harrison |
| 2005/0063251 A1 | 3/2005 | Guidry et al. |
| 2005/0194130 A1 | 9/2005 | Best et al. |
| 2005/0194185 A1 | 9/2005 | Gleitman |
| 2005/0211468 A1 | 9/2005 | Veeningen et al. |
| 2006/0151214 A1 | 7/2006 | Prange et al. |
| 2006/0247903 A1 | 11/2006 | Schottle et al. |
| 2007/0199721 A1 | 8/2007 | Givens et al. |
| 2008/0172272 A1 | 7/2008 | Back et al. |
| 2009/0006058 A1 | 1/2009 | King |
| 2009/0056935 A1 | 3/2009 | Prange et al. |
| 2009/0076873 A1 | 3/2009 | Johnson et al. |
| 2009/0090555 A1* | 4/2009 | Boone ............... E21B 44/00 175/45 |
| 2009/0120690 A1 | 5/2009 | Phillips |
| 2010/0030527 A1 | 2/2010 | Prasad et al. |
| 2010/0139977 A1 | 6/2010 | Watkins et al. |
| 2010/0185395 A1 | 7/2010 | Pirovolou et al. |
| 2010/0191516 A1 | 7/2010 | Benish et al. |
| 2010/0259415 A1 | 10/2010 | Strachan et al. |
| 2010/0282508 A1 | 11/2010 | Johnston et al. |
| 2011/0031015 A1* | 2/2011 | Downton ........... H04L 67/12 175/27 |
| 2011/0067928 A1 | 3/2011 | Hulden et al. |
| 2011/0153300 A1 | 6/2011 | Holl et al. |
| 2011/0161133 A1 | 6/2011 | Staveley et al. |
| 2012/0018219 A1* | 1/2012 | Runia ................. E21B 7/04 175/26 |
| 2012/0048618 A1* | 3/2012 | Zamanian ......... E21B 47/024 702/6 |
| 2012/0048621 A1 | 3/2012 | Stewart et al. |
| 2012/0285701 A1* | 11/2012 | Cheng ................ E21B 43/30 166/369 |
| 2013/0032402 A1 | 2/2013 | Byreddy et al. |
| 2013/0048383 A1 | 2/2013 | Panchal et al. |
| 2013/0092441 A1 | 4/2013 | Hummes et al. |
| 2013/0092450 A1 | 4/2013 | Sreshta |
| 2013/0140037 A1 | 6/2013 | Sequeira, Jr. et al. |
| 2013/0140088 A1 | 6/2013 | Williams |
| 2013/0151219 A1* | 6/2013 | Spencer ............. G06F 30/20 702/9 |
| 2013/0161096 A1 | 6/2013 | Benson et al. |
| 2013/0161097 A1* | 6/2013 | Benson ............... E21B 47/12 175/26 |
| 2013/0262048 A1 | 10/2013 | Tang et al. |
| 2013/0340999 A1 | 12/2013 | Benson |
| 2015/0193705 A1 | 7/2015 | Benson et al. |
| 2015/0330209 A1 | 11/2015 | Panchal et al. |
| 2020/0320649 A1 | 10/2020 | Benson et al. |

FOREIGN PATENT DOCUMENTS

| | | |
|---|---|---|
| CN | 102900366 A | 1/2013 |
| GB | 2236782 A | 4/1991 |
| GB | 2439489 A | 12/2007 |
| WO | 2006118873 A2 | 11/2006 |
| WO | 2009039448 A2 | 3/2009 |
| WO | 2010053618 A1 | 5/2010 |
| WO | 2012173601 A1 | 12/2012 |

(56) References Cited

FOREIGN PATENT DOCUMENTS

OTHER PUBLICATIONS

"Answer to Counterclaim filed by Nabors Drilling Technologies USA Inc.", Case #3:20-cv-03126-M, Document 38, Nov. 30, 2020, 7 pages.
"Appendix in Support of Defendants' Opening Claim Construction Brief", 3:20-cv-03126-M, Document 90, Jul. 22, 2021, 86 pages.
"Appendix in Support of Defendants' Response in Opposition to Plaintiffs Motion for Reconsideration of the Court's Claim Construction Order (Ecf No. 134)", Re: 'detection of Flow Rate', 3:20-cv-03126-M, Document 157, Oct. 5, 2022, 96 pages.
"Appendix in Support of Plaintiff Nabors Drilling Technologies USA, Inc.'s Reply in Support of Its Motion for Reconsideration of the Court's Claim Construction Order (Ecf No. 134)", 'detection of Flow Rate', 3:20-cv-03126-M, Document 168, Oct. 19, 2022, 8 pages.
"Claim Comparison Chart (Claim Numbering in Petition Added)", U.S. Appl. No. 11,170,454, 3 pages.
"Claim Construction Memorandum Opinion and Order", 3:20-cv-03126-M, Document 126, May 26, 2022, 32 pages.
"Claim Construction Memorandum Opinion and Order", 3:20-cv-03126-M, Document 134, Aug. 17, 2022, 37 pages.
"COMPASS™ Software : Data Sheet", DecisionSpace® Drilling & Completions, Nabors Drilling Technologies USA, Inc., Halliburton Landmark, 2013, 4 pages.
"Counterclaim against Nabors Drilling Technologies USA filed by Motive Drilling Technologies, Helmerich 17 & Payne International Drilling Co, Helmerich & Payne Technologies LLC", *Nabors Drilling Technologies USA Inc v. Helmerich & Payne International Drilling Co et al.*, Case #3:20-cv-03126-M, Document 19, Nov. 9, 2020, 20 pages.
"Defendant's "Response in Opposition to Plaintiffs Motion of Partial Judgment on the Pleadings", [ECF No. 181," 3:20-cv-03126-M, Document 188, Jan. 12, 2023, 29 pages.
"Defendants' Answer to Plaintiff's First Amended Complaint and Defendants' Second Amended Counterclaims", 3:20-cv-03126-M, Document 54, Jan. 8, 2021, 58 pages.
"Defendants' Response in Opposition to Plaintiffs Motion for Reconsideration of the Court's Claim Construction Order (Ecf No. 134)", Re: 'detection of Flow Rate', 3:20-cv-03126-M, Document 156, Oct. 5, 2022, 22 pages.
"Defendant's Response in Opposition to Plaintiffs Motion for Reconsideration of the Court's Memorandum Opinion and Order Dismissing Nabors's Claims of Infringement of the '593 and '081 Patents", 3:20-cv-03126-M, Document 186, Jan. 12, 2023, 26 pages.
"Director's Blog: the latest from USPTO leadership", Jul. 25, 2022, 5 pages.
"File History of U.S. Appl. No. 14/652,164", Exhibit 1013, 248 pages.
"File History of U.S. Appl. No. 15/180,661", Exhibit 1002, 273 pages.
"H&P's Opening Claim Construction Brief filed by Helmerich & Payne International Drilling Co, Helmerich & 20 Payne Technologies LLC, Motive Drilling Technologies Inc.", Case #3:20-cv-03126-M, Document 89, Jul. 22, 2021, 37 pages.
"Motive's U.S. Pat. No. 10,726,506—Invalidity (Anticipated, 35 U.S.C. § 102(b) and Obvious, 35 U.S.C. § 103(a)) in view of U.S. Appl. No. 2010/0185395 A1 to Pirovolou et al. (hereinafter "Schlumberger 1")", Exhibit C-1, pp. 1-28.
"Motive's U.S. Pat. No. 9,865,022—Invalidity (Anticipated, 35 U.S.C. § 102(b) and Obvious, 35 U.S.C. § 103(a)) in view of U.S. Appl. No. 2010/0185395 A1 to Pirovolou et al. (hereinafter "Schlumberger 1")", 3:20-cv-03126-M, Exhibit B-2, pp. 1-31.
"Motive's U.S. Pat. No. 10,726,506—Invalidity (Obvious, 35 U.S.C. § 103(a)) in view of U.S. Pat. Pub. No. 2010/0185395 to Pirovolou (hereinafter Schlumberger 1 ') in view of U.S. Appl. No. 2006/0247903 to Schottle (hereinafter 'Halliburton')", 3:20-cv-03126-M, Exhibit C-2, 51 pages.
"Motive's U.S. Pat. No. 10,726,506—Invalidity (Obvious, 35 U.S.C. § 103(a)) in view of U.S. Pat. Pub. No. US 2010/0185395 to Pirovolou (hereinafter Schlumberger 1 ')", and U.S. Pat. No. 7,684,929 et al. to Prange et al.(hereinafter 'Schlumberger 2') and U.S. Appl. No. 2006/0247903 to Schottle (hereinafter 'Halliburton'), 3:20-cv-03126-M, Exhibit C-3, pp. 1-77.
"Motive's U.S. Pat. No. 10,726,506—Invalidity (Obvious, 35 U.S.C. § 103(a)) in view of U.S. Appl. No. US 2010/0185395 to Pirovolou (hereinafter Schlumberger 1 ') and U.S. Pat. No. 7,684,929 to Prange et al. (hereinafter Schlumberger 2)", and U.S. Pat. No. 20091000823A 1 to Pirovoulou (hereinafter Schlumberger 3') and U.S. Appl. No. 2012/0024606 A 1 to Pirovolou et al. (hereinafter 'Schlumberger 4') and U.S. Pat. No. 200610247903A 1 to Schottle et al.(hereinafter 'Halliburton'), 99 pages.
"Motive's U.S. Pat. No. 9,865,022—Invalidity (Anticipated, 35 U.S.C. § 102(b) and Obvious, 35 U.S.C. § 103(a)) in view of U.S. Pat. Pub. No. 2006/0247903 A1 to Schottle (hereinafter 'Halliburton')", 3:20-cv-03126-M, Exhibit B-1, pp. 1-27.
"Motive's U.S. Pat. No. 9,865,022—Invalidity (Obvious, 35 U.S.C. § 103(a)) in view of U.S. Pat. Pub. No. US 2010/0185395 to Pirovolou (hereinafter Schlumberger 1 ') and U.S. Pat. No. 200610247903A 1 to Schottle et al.(hereinafter 'Halliburton')", 3:20-cv-03126-M, Exhibit B-3, pp. 1-48.
"Motive's U.S. Pat. No. 9,865,022—Invalidity (Obvious, 35 U.S.C. § 103(a)) in view of U.S. Pat. No. 2010/0185395 to Pirovolou (hereinafter Schlumberger 1 ') and U.S. Pat. No. 7,684,929 to Prange et al. (hereinafter Schlumberger 2)", 3:20-cv-03126-M, Exhibit B-5, pp. 1-42.
"Motive's U.S. Pat. No. 9,865,022—Invalidity (Obvious, 35 U.S.C. § 103(a)) in view of U.S. Pat. No. 2010/0185395 to Pirovolou (hereinafter Schlumberger 1 ') and U.S. Pat. No. 7,684,929 to Prange et al. (hereinafter Schlumberger 2) and U.S. Pat. No. 2009100082", 3:20-cv-03126-M, Exhibit B-4, pp. 1-57.
"Motive's U.S. Pat. No. 9,865,022—Invalidity (Obvious, 35 U.S.C. § 103(a)) in view of U.S. Pat. No. 2010/0185395 to Pirovolou (hereinafter Schlumberger 1 ') and U.S. Pat. No. 7,684,929 to Prange et al. (hereinafter Schlumberger 2) and U.S. Pat. No. 2009100082", 3:20-cv-03126-M, Exhibit B-6, pp. 1-68.
"Motive's U.S. Pat. No. 9,865,022—Invalidity (Obvious, 35 U.S.C. § 103(a)) in view of U.S. Appl. No. 2010/0185395 to Pirovolou (hereinafter Schlumberger 1 ') and U.S. Pat. No. 7,684,929 to Prange et al. (hereinafter Schlumberger 2) and US 20", 3:20-cv-03126-M, Exhibit B-7, pp. 1-80.
"Nabor's Brief in Support if its Motion for Partial Judgment on the Pleadings", 3:20-cv-03126-M, Document 182, Dec. 15, 2022, 30 pages.
"Nabor's Reply to Defendant's Response to Nabor's Motion for Partial Judgment on the Pleadings", 3:20-cv-03126-M, Document 194, Feb. 2, 2023, 16 pages.
"Notice of H&Ps Notice of Material Provided to the Court at the Markman Hearing filed by Helmerich & Payne International Drilling Co, Helmerich & Payne Technologies, LLC, Motive Drilling Technologies Inc.", 3:20-cv-03126-M, Document 106, Oct. 7, 2021, 182 pages.
"Notice of Material Provides to the Court at the Markman Hearing filed by Nabors Drilling Technologies USA Inc.", 3:20-cv-03126-M, Document 106, Oct. 7, 2021, 91 pages.
"Oilfield Glossary", Schlumberger, Nabors Drilling Technologies USA, Inc., Accessed from Internet on Dec. 21, 2021, 1 page.
"P.R. 4-5(d) Joint Claim Construction Chart", 3:20-cv-03126-M, Document 97, Sep. 9, 2021, 28 pages.
"Panel Change Order Conduct of the Proceedings 37 C.F.R. § 42.5", *Nabors Drilling Technologies USA, Inc.*, Petitioner, V., *Motive Drilling Technologies, Inc.*, Patent Owner, Paper No. 12, Jun. 23, 2022, 3 pages.
"Petitioner Replies to Patent Owner's Preliminary Responses", Jun. 15, 2022, 2 pages.
"Petitioner's Power of Attorney Pursuant To 37 C.f.r. § 42.I0(B) For Petition For Inter Partes Review U.S. Pat. No. 10,726,506", Nabors Corporate Services, Inc., Jul. 28, 2020, 2 pages.

(56) References Cited

OTHER PUBLICATIONS

"Petitioner's Power of Attorney Pursuant To 37 C.f.r. § 42.I0(B) For Petition For Inter Partes Review U.S. Pat. No. 10,726,506", Nabors Drilling Technologies Inc, Jul. 28, 2020, 2 pages.
"Petitioner's Power of Attorney Pursuant to 37 C.F.R. § 42.I0(B) for Petition for Inter Partes Review U.S. Pat. No. 9,865,022", Nabors Corporate Services, Inc., Jan. 9, 2018, 2 pages.
"Petitioner's Power of Attorney Pursuant to 37 C.F.R. § 42.I0(B) for Petition for Inter Partes Review U.S. Pat. No. 9,865,022", Nabors Drilling Technologies Inc, Jan. 9, 2018, 2 pages.
"Petitioner's Power of Attorney Pursuant to 37 C.F.R. § 42.I0(b) for Petition for Post-Grant Review U.S. Pat. No. 11,170,454", Nabors Corporate Services, Inc., Nov. 9, 2021, 3 pages.
"Petitioner's Power of Attorney Pursuant to 37 C.F.R. § 42.I0(b) for Petition for Post-Grant Review U.S. Pat. No. 11,170,454", Nabors Drilling Technologies Inc, Nov. 9, 2021, 3 pages.
"Plaintiff Nabors Drilling Technologies USA, Inc.'s Preliminary Invalidity Contentions Pursuant To Patent Local Rules 3-3 & 3-4", 3:20-cv-03126-M, Mar. 24, 2021, 28 pages.
"Plaintiff Nabors Drilling Technologies USA, Inc.'s Motion for Reconsideration of the Court's Claim Construction Order (Ecf No. 134)", Re: 'detection of Flow Rate', 3:20-cv-03126-M, Document 143, Sep. 14, 2022, 65 pages.
"Plaintiff Nabors Drilling Technologies USA, Inc.'s Reply in Support of Its Motion for Reconsideration of the Court's Claim Construction Order (Ecf No. 134)", Re: 'detection of Flow Rate', 3:20-cv-03126-M, Document 167, Oct. 19, 2022, 11 pages.
"Reply filed by Helmerich & Payne International Drilling Co, Helmerich & Payne Technologies LLC, Motive Drilling Technologies Inc., re 91 Response/Objection", 3:20-cv-03126-M, Document 95, Sep. 2, 2021, 21 pages.
"Resume of Dr. Jerome J. Schubert", 30 pages.
"Scheduling Order", Nabors Drilling Technologies USA, Inc., Petitioner, V., Motive Drilling Technologies, Inc., Patent Owner, Paper 14, Jul. 11, 2022.
"Scheduling Order", Nabors Drilling Technologies USA, Inc., Petitioner, V., Motive Drilling Technologies, Inc., Patent Owner, Paper 13, Jul. 11, 2022, 14 pages.
"Schlumberger—Inclination: Definition", Oilfield Glossary, 2013, 1 page.
"Schlumberger—Well Plan & Wellbore: Definitions", Oilfield Glossary, Exhibit 1014, 2013, 2 pages.
"Schlumberger—Well Plan : Definitions", Oilfield Glossary, Available online at: https://web.archive.org/, Accessed from Internet on Dec. 21, 2021, 1 page.
"Schlumberger: Rate of Penetration : Definition", Oilfield Glossary, Dec. 21, 2021, 1 page.
"Second Amended Patent Scheduling Order", 3:20-cv-03126-M, Document 73, Apr. 23, 2021, 12 pages.
"Wellbore Planner User Guide", Landmark Graphics Corporation, Halliburton, Mar. 2008, 62 pages.
U.S. Appl. No. 14/067,390 , "Final Office Action", Sep. 30, 2014, 6 pages.
U.S. Appl. No. 14/067,390 , "Non-Final Office Action", Mar. 20, 2014, 15 pages.
U.S. Appl. No. 14/067,390 , "Non-Final Office Action", Jul. 28, 2014, 5 pages.
U.S. Appl. No. 14/067,390 , "Notice of Allowance", Jan. 21, 2015, 15 pages.
U.S. Appl. No. 15/180,661 , "Final Office Action", Mar. 28, 2017, 14 pages.
U.S. Appl. No. 15/180,661 , "Non-Final Office Action", Feb. 2, 2017, 13 pages.
U.S. Appl. No. 15/180,661 , "Notice of Allowance", Aug. 30, 2017, 16 pages.
U.S. Appl. No. 15/836,563 , "Non-Final Office Action", Dec. 31, 2019, 12 pages.
U.S. Appl. No. 15/836,563 , "Notice of Allowance", Mar. 20, 2020, 11 pages.
U.S. Appl. No. 16/906,571 , "Notice of Allowance", Jul. 1, 2021, 24 pages.
U.S. Appl. No. 17/449,707 , "Non-Final Office Action", Oct. 25, 2023, 7 pages.
U.S. Appl. No. 17/449,707 , "Notice of Allowance", Apr. 17, 2024, 8 pages.
U.S. Appl. No. 18/452,249 , "Non-Final Office Action", Oct. 25, 2023, 11 pages.
U.S. Appl. No. 18/452,249 , "Notice of Allowance", Mar. 13, 2024, 15 pages.
U.S. Appl. No. 61/737,015 , "U.S. Provisional Application No.", Apr. 11, 2014, 48 pages.
U.S. Appl. No. 61/839,731 , "U.S. Provisional Application No.", Exhibit 2003, Jun. 26, 2013, 56 pages.
AU2014302666 , "First Examination Report", Apr. 5, 2016, 2 pages.
AU2014302666 , "Notice of Acceptance", Mar. 21, 2017, 3 pages.
Buchanan et al., "Geomagnetic Referencing-The Real-Time Compass for Directional Drillers", Oilfield Review, vol. 25, No. 3, Sep. 2013, pp. 32-47.
CA2,914,961 , "Office Action", Nov. 25, 2021, 2 pages.
CA2914961 , "Notice of Allowance", Apr. 6, 2021, 1 page.
CA2914961 , "Notice of Allowance", Aug. 30, 2022, 1 pages.
CA2914961 , "Office Action", Jun. 18, 2020, 7 pages.
CA3,186,224 , "Notice of Allowance", May 10, 2024, 1 page.
Case 3:20-CV-03126-M , "Joint Status Report Regarding Impact of IPR Decisions", Nabors Drilling Technologies USA, Inc., Plaintiff/Counter-Defendant, Vs. Helmerich & Payne Int'l Drilling Co.; Helmerich & Payne Technologies, LLC; and Motive Drilling Technologies, Inc., Defendants/Counter-Claimant, Jul. 13, 2023, 8 pages.
Case 3:20-CV-03126-M , "Notice of Stipulation", Nabors Drilling Technologies USA, Inc., Plaintiff/Counter-Defendant, Vs. Helmerich & Payne Int'l Drilling Co.; Helmerich & Payne Technologies, LLC; and Motive Drilling Technologies, Inc., Defendants/Counter-Claimant, Jul. 17, 2023, 3 pages.
Case 3:20-CV-03126-M , "Stipulated Judgment of Non-Infringement and Stipulated Dismissal", Nabors Drilling Technologies USA, Inc., Plaintiff, v. Helmerich & Payne Int'l. Drilling Co.; Helmerich & Payne Technologies, LLC; and Motive Drilling Technologies, Inc. Defendants, Jul. 13, 2023, 9 pages.
Case IPR2022-00288 , "Final Written Decision Determining All Challenged Claims Unpatentable 35 U.S.C. § 318(a) Dismissing Patent Owner's Motion to Exclude 37 C.F.R. § 42.64", Before the Patent Trial and Appeal Board, Jul. 5, 2023, 66 pages.
Case IPR2022-00289 , "Final Written Decision Determining All Challenged Claims Unpatentable 35 U.S.C. § 318(a) Dismissing Patent Owner's Motion to Exclude 37 C.F.R. § 42.64", Before the Patent Trial and Appeal Board, Jul. 5, 2023, 65 pages.
Case No. IPR2022-00288 , "Mandatory Notices of Patent Owner Under 37 C.F.R. § 42.8(a)(2)", United States Patent and Trademark Office, Before the Patent Trial and Appeal Board, Jan. 25, 2022, 5 pages.
CN201480045543.3 , "Notice of Decision to Grant", Mar. 25, 2019, 1 page.
CN201480045543.3 , "Supplementary Search", Mar. 5, 2019, 1 page.
Comeaux et al., "Automated Directional Drilling Market Survey Results", IPR2022-00288, Exhibit 2021, Apr. 3-4, 2018, 61 pages.
Davis , "H&P's Takeover of Motive Signals Move to High Tech Directional Drilling", IPR2022-00288, Exhibit 2016, May 23, 2017, 3 pages.
Devereux , "Practical Well Planning and Drilling Manual", Nabors Drilling Technologies USA, Inc., WTS No. 305288, 1998, 88 pages.
EP14817595.3 , "Extended European Search Report", Sep. 30, 2016, 10 pages.
EP14817595.3 , "Office Action", Apr. 12, 2018, 8 pages.
EP14817595.3 , "Summons to Attend Oral Proceedings", Jul. 11, 2023, 11 pages.
EP14817595.3 , "Summons to Attend Oral Proceedings", Apr. 15, 2019, 9 pages.

(56) References Cited

OTHER PUBLICATIONS

Farah, "Directional Well Design, Trajectory and Survey Calculations, with a Case Study in Fiale, Asal Rift, Djibouti", Ministry of Energy and Natural Resources, Reports 2013, No. 27, 2013, pp. 625-658.
IPR2022-00288, "Automated Directional Drilling Gaining Trust Among Industry Users", Exhibit 2020, Mar. 16, 2021, 4 pages.
IPR2022-00288, "Compass Software: Decision Space Drilling & Completions", Exhibit 1016, 2013, 4 pages.
IPR2022-00288, "Decision Granting Institution of Inter Partes Review 35 U.S.C. § 314", *Nabors Drilling Technologies USA, Inc.*, Petitioner, V., *Motive Drilling Technologies, Inc.*, Patent Owner, Paper 13, Jul. 8, 2022, 38 pages.
IPR2022-00288, "Declaration of Dr. L. Brun Hilbert, Jr., Ph.D., P.E.", *Nabors Drilling Technologies USA, Inc.*, Petitioner, v, *Motive Drilling Technologies, Inc.*, Patent Owner, Exhibit 2010, Oct. 8, 2022, 112 pages.
IPR2022-00288, "Declaration of James Williams", *Nabors Drilling Technologies USA, Inc.*, Petitioner, V. *Motive Drilling Technologies, Inc.*, Patent Owner, Exhibit 2023, Mar. 23, 2023, 4 pages.
IPR2022-00288, "Declaration of Jerome J. Schubert, Ph.d., Pe, Under 37 C.F.R. § 1.68 in Support of Petition for Inter Partes Review of U.S. Pat. No. 9,865,022", EX1003, United States Patent and Trademark Office, Jan. 6, 2022, 137 pages.
IPR2022-00288, "Defendants' Disclosure of Asserted Claims and Preliminary Infringement Contentions", 3:20-cv-03126-M, Exhibit 2001, Mar. 24, 2021, 3 pages.
IPR2022-00288, "Defendants' Disclosure of Asserted Claims and Preliminary Infringement Contentions", Exhibit 2003, Mar. 24, 2021, 5 pages.
IPR2022-00288, "Defendants' Preliminary Election of Asserted Claims", Exhibit 2004, Apr. 12, 2022, 2 pages.
IPR2022-00288, "Defendants' Supplemental Infringement Contentions", Exhibit 2005, Apr. 12, 2022, 3 pages.
IPR2022-00288, "Deposition of Dr. Hilbert Transcript 1.6.23", *Nabors Drilling Technologies USA, Inc.*, Petitioner, V., *Motive Drilling Technologies, Inc.*, Exhibit 1029, Jan. 6, 2023, 152 pages.
IPR2022-00288, "Deposition of Dr. Hilbert Transcript Exhibit A", *Nabors Drilling Technologies USA, Inc.*, Petitioner, V., *Motive Drilling Technologies, Inc.*, Exhibit 1030, Jan. 6, 2023, 1 page.
IPR2022-00288, "Deposition of Dr. Hilbert Transcript Exhibit B", *Nabors Drilling Technologies USA, Inc.*, Petitioner, V., *Motive Drilling Technologies, Inc.*, Exhibit 1031, Jan. 6, 2023, 1 page.
IPR2022-00288, "Deposition Transcript Dr. Schubert", *Nabors Drilling Technologies USA, Inc.*, Petitioner, V., *Motive Drilling Technologies, Inc.*, Patent Owner, Exhibit 2011, Oct. 7, 2022, 106 pages.
IPR2022-00288, "Fed Circuit Mandate Order", *Motive Drilling Technologies, Inc.* Appellant, V. *Katherine K. Vidal*, Dec. 18, 2023, 2 pages.
IPR2022-00288, "Form 10-K (Annual Report) Filed Nov. 22, 2017 for Period Ending Sep. 30, 2017", Helmerich & Payne, Inc., Exhibit 2019, Nov. 22, 2017, 124 pages.
IPR2022-00288, "H&P Technologies Presentation", *Nabors Drilling Technologies USA, Inc.*, Petitioner, V., *Motive Drilling Technologies, Inc.*, Exhibit 2014, 67 pages.
IPR2022-00288, "Judgment—Final Written Decision Determining All Challenged Claims Unpatentable 35 U.S.C. § 318(a) Dismissing Patent Owner's Motion to Exclude 37 C.F.R. § 42.64", *Nabors Drilling Technologies USA, Inc.*, Petitioner, v. *Motive Drilling Technologies, Inc.*, Patent Owner., Paper 34, Jul. 5, 2023, 66 pages.
IPR2022-00288, "Letter from Chief Judge Barbara M.G. Lynn to all Attorneys of Record", 3:20-CV-3126-M, Mar. 25, 2022, 1 page.
IPR2022-00288, "Motive Drilling Technologies Announces $10.5 Million Series A Funding with Formation 8 and GE Ventures", Exhibit 2017, Feb. 17, 2016, 2 pages.
IPR2022-00288, "Motive Drilling Technologies Named Most Promising Energy & Clean Technology Company at Rice Alliance Energy & Clean Technology Venture Forum", Exhibit 2022, Sep. 20, 2016, 7 pages.
IPR2022-00288, "Notice of Filing Date Accorded to Petition and Time For Filing Patent Owner Preliminary Response", Jan. 12, 2022, 5 pages.
IPR2022-00288, "Order Conduct of the Proceeding 37 C.F.R. § 42.5", *Nabors Drilling Technologies USA, Inc.*, Petitioner, V. *Motive Drilling Technologies, Inc.*, Patent Owner, Apr. 21, 2022, 4 pages.
IPR2022-00288, "Order Conduct of the Proceeding 37 C.F.R. § 42.5", *Nabors Drilling Technologies USA, Inc.*, Petitioner, V., *Motive Drilling Technologies, Inc.*, Paper 9, Jun. 17, 2022, 4 pages.
IPR2022-00288, "Patent Owner Power of Attorney", 3 pages.
IPR2022-00288, "Patent Owner's Objections Under 37 C.f.r. § 42.64(B) to Petitioner's Evidence Submitted With The Petition", 6 pages.
IPR2022-00288, "Patent Owner's Opposition to Petitioner's Motion to Exclude Evidence", *Nabors Drilling Technologies USA, Inc.*, Petitioner, V. *Motive Drilling Technologies, Inc.*, Patent Owner, Mar. 23, 2023, 22 pages.
IPR2022-00288, "Patent Owner's Preliminary Response Under 37 C.F.R. § 42.107", 74 pages.
IPR2022-00288, "Patent Owner's Sur-Reply to Petitioner's Reply", *Nabors Drilling Technologies USA, Inc.*, Petitioner, V. *Motive Drilling Technologies, Inc.*, Patent Owner, Mar. 9, 2023, 35 pages.
IPR2022-00288, "Patent Owner's Updated Exhibit List", *Nabors Drilling Technologies USA, Inc.*, Petitioner, V. *Motive Drilling Technologies, Inc.*, Patent Owner, Apr. 18, 2023, 5 pages.
IPR2022-00288, "Patent Owner's Notice of Appeal", *Nabors Drilling Technologies USA, Inc.*, Petitioner, V. *Motive Drilling Technologies, Inc.*, Patent Owner, Sep. 5, 2023, 7 pages.
IPR2022-00288, "Patent Owner's Response Under 37 C.F.R. § 42.107", *Nabors Drilling Technologies USA, Inc.*, Petitioner, V., *Motive Drilling Technologies, Inc.*, Patent Owner, Paper 18, Oct. 20, 2022, 87 pages.
IPR2022-00288, "Petition for Inter Partes Review of U.S. Pat. No. 9,865,022", United States Patent and Trademark Office, Before the Patent Trial and Appeal Board, Jan. 6, 2022, pp. 1-107.
IPR2022-00288, "Petitioner's Motion to Exclude Evidence Under 37 C.F.R. 42.64(c)", *Nabors Drilling Technologies USA, Inc.*, Petitioner, V. *Motive Drilling Technologies, Inc.*, Patent Owner, Mar. 16, 2023, 18 pages.
IPR2022-00288, "Petitioner's Reply to Patent Owner's Opposition to Petitioner's Motion to Exclude Evidence", *Nabors Drilling Technologies USA, Inc.*, Petitioner, V. *Motive Drilling Technologies, Inc.*, Patent Owner, Mar. 30, 2023, 8 pages.
IPR2022-00288, "Petitioner's Reply to Patent Owner's Response", *Nabors Drilling Technologies USA, Inc.*, Petitioner, V., *Motive Drilling Technologies, Inc.*, Paper 22, Jan. 26, 2023, 39 pages.
IPR2022-00288, "Petitioner's Updated Exhibit List", *Nabors Drilling Technologies USA, Inc.*, Petitioner, V. *Motive Drilling Technologies, Inc.*, Patent Owner, Apr. 18, 2023, 6 pages.
IPR2022-00288, "Plaintiff Nabors Drilling Technologies USA, Inc.'s Preliminary Election of Asserted Prior Art", 4 pages.
IPR2022-00288, "Plaintiff Nabors Drilling Technologies USA, Inc.'s Responsive Claim Construction Brief—Part 1", 3:20-cv-03126, Document 91, Aug. 19, 2021, 559 pages.
IPR2022-00288, "Plaintiff Nabors Drilling Technologies USA, Inc.'s Responsive Claim Construction Brief—Part 2", 3:20-cv-03126, Document 91, Aug. 19, 2021, 537 pages.
IPR2022-00288, "Plaintiff Nabors Drilling Technologies USA, Inc.'s Preliminary Election of Asserted Prior Art", *Nabors Drilling Technologies USA, Inc. v. Motive Drilling Technologies, Inc.*, Motive Exhibit 2006, Apr. 12, 2022, 4 pages.
IPR2022-00288, "Record of Oral Hearing", *Nabors Drilling Technologies USA, Inc.*, Petitioner, V. *Motive Drilling Technologies, Inc.*, Patent Owner, Apr. 20, 2023, 65 pages.
IPR2022-00288, "Supplemental Declaration of Jerome J. Schubert, Ph.D., PE, in Support of Petitioner's Reply", *Nabors Drilling Technologies USA, Inc.*, Petitioner, V., *Motive Drilling Technologies, Inc.*, Exhibit 1028, Jan. 25, 2023, 16 pages.
IPR2022-00288 & IPR2022-00289, "Patent Owner's Presentation *Nabors Drilling Technologies USA, Inc. v. Motive Drilling Technologies, Inc.*", Patent Owner's Demonstratives, Apr. 20. 2023, 68 pages.

(56) References Cited

OTHER PUBLICATIONS

IPR2022-00288 & IPR2022-00289, "Petitioner's Demonstratives", *Nabors Drilling Technologies USA, Inc. v. Motive Drilling Technologies, Inc.*, EX1035, Apr. 20, 2023, 44 pages.
IPR2022-00288 & IPR2022-00289, "Petitioner's Demonstratives", Patent Owner's Presentation, *Nabors Drilling Technologies USA, Inc. v. Motive Drilling Technologies, Inc.*, Exhibit 2024, Apr. 20, 2023, 68 pages.
IPR2022-00288 & IPR2022-00289, "Record of Oral Hearing", May 30, 2023, 65 pages.
IPR2022-00289, "Decision Granting Institution of Inter Partes Review 35 U.S.C. § 314", *Nabors Drilling Technologies USA, Inc.*, Petitioner, V., *Motive Drilling Technologies, Inc.*, Paper 12, Jul. 8, 2022, 36 pages.
IPR2022-00289, "Decision Granting Institution of Inter Partes Review 35 U.S.C. § 314", *Nabors Drilling Technologies USA, Inc.*, Petitioner, V., *Motive Drilling Technologies, Inc.*, Patent Owner, Paper 13, Jul. 8, 2022, 38 pages.
IPR2022-00289, "Declaration of Dr. Hilbert", *Nabors Drilling Technologies USA, Inc.*, Petitioner, V., *Motive Drilling Technologies, Inc.*, Patent Owner, Exhibit 2010, Oct. 8, 2022, 112 pages.
IPR2022-00289, "Declaration of James Williams", *Nabors Drilling Technologies USA, Inc.*, Petitioner, V. *Motive Drilling Technologies, Inc.*, Patent Owner, Exhibit 2023, Mar. 23, 2023, 4 pages.
IPR2022-00289, "Declaration of Jerome J. Schubert, Ph.D., PE, Under 37 C.F.R. § 1.68 In Support of Petition for Inter Partes Review of U.S. Pat. No. 10,726,506", *Nabors Drilling Technologies USA, Inc.*, Petitioner, v., *Motive Drilling Technologies, Inc.*, Nabors EX1003, Jan. 6, 2022, pp. 1-127.
IPR2022-00289, "Defendants' Disclosure of Asserted Claims and Preliminary Infringement Contentions", *Nabors Drilling Technologies USA, Inc. v. Motive Drilling Technologies, Inc.*, 2003, 5 pages.
IPR2022-00289, "Defendants' Preliminary Election of Asserted Claims", 2 pages.
IPR2022-00289, "Defendants' Supplemental Infringement Contentions", 3 pages.
IPR2022-00289, "Fed Circuit Mandate Order", *Motive Drilling Technologies, Inc.* Appellant, V. *Katherine K. Vidal*, Inventor, Patent Owner, Dec. 18, 2023, 2 pages.
IPR2022-00289, "File History of U.S. Appl. No. 15/836,563", Exhibit 1002, 510 pages.
IPR2022-00289, "H&P's Patent Rule 4-2 Disclosure", 3:20-cv-03126-M, 14 pages.
IPR2022-00289, "Judgment—Final Written Decision Determining All Challenged Claims Unpatentable 35 U.S.C. § 318(a) Dismissing Patent Owner's Motion to Exclude 37 C.F.R. § 42.64", *Nabors Drilling Technologies USA, Inc.*, Petitioner, v. *Motive Drilling Technologies, Inc.*, Patent Owner., Jul. 5, 2023, 65 pages.
IPR2022-00289, "Letter from Chief Judge Barbara M.G. Lynn to all Attorneys of Record", Mar. 25, 2022, 1 page.
IPR2022-00289, "Mandatory Notices of Patent Owner Under 37 C.F.R. § 42.8(A)(2)", *Nabors Drilling Technologies USA, Inc.*, Petitioner, V., *Motive Drilling Technologies, Inc.,*, pp. 1-5.
IPR2022-00289, "Notice of Filing Date Accorded to Petition and Time for Filing Patent Owner Preliminary Response", *Nabors Drilling Technologies USA, Inc.*, Petitioner, V., *Motive Drilling Technologies, Inc.,*, Jan. 12, 2022, 5 pages.
IPR2022-00289, "Patent Owner Power of Attorney", *Nabors Drilling Technologies USA, Inc.*, Petitioner, V., *Motive Drilling Technologies, Inc.,*, 3 pages.
IPR2022-00289, "Patent Owner's Objections Under 37 C.F.R. § 42.64(B) To Petitioner's Evidence Submitted with The Petition", *Nabors Drilling Technologies USA, Inc.*, Petitioner, V., *Motive Drilling Technologies, Inc.,*, 6 pages.
IPR2022-00289, "Patent Owner's Opposition to Petitioner's Motion to Exclude Evidence", *Nabors Drilling Technologies USA, Inc.*, Petitioner, V. *Motive Drilling Technologies, Inc.*, Patent Owner, Mar. 23, 2023, 22 pages.
IPR2022-00289, "Patent Owner's Preliminary Response Under 37 C.F.R. § 42.107", *Nabors Drilling Technologies USA, Inc.*, Petitioner, V., *Motive Drilling Technologies, Inc.,*, Apr. 12, 2022, 68 pages.
IPR2022-00289, "Patent Owner's Sur-Reply", *Nabors Drilling Technologies USA, Inc.*, Petitioner, V. *Motive Drilling Technologies, Inc.*, Patent Owner, Mar. 9, 2023, 35 pages.
IPR2022-00289, "Patent Owner's Updated Exhibit List", *Nabors Drilling Technologies USA, Inc.*, Petitioner, V. *Motive Drilling Technologies, Inc.*, Patent Owner, Apr. 18, 2023, 5 pages.
IPR2022-00289, "Patent Owner's Notice of Appeal", *Nabors Drilling Technologies USA, Inc.*, Petitioner, V. *Motive Drilling Technologies, Inc.*, Patent Owner, Sep. 5, 2023, 7 pages.
IPR2022-00289, "Patent Owner's Preliminary Response Under 37 C.F.R. § 42.107", *Nabors Drilling Technologies USA, Inc.*, Petitioner, V., *Motive Drilling Technologies, Inc.*, Patent Owner, Paper 7, Apr. 12, 2022, 74 pages.
IPR2022-00289, "Patent Owner's Response Under 37 C.F.R. § 42.107", *Nabors Drilling Technologies USA, Inc.*, Petitioner, V., *Motive Drilling Technologies, Inc.*, Patent Owner, Paper 17, Oct. 20, 2022, 85 pages.
IPR2022-00289, "Petition For Inter Partes Review of U.S. Pat. No. 10,726,506", *Nabors Drilling Technologies USA, Inc. v. Motive Drilling Technologies, Inc.*, Paper 3, 102 pages.
IPR2022-00289, "Petitioner's Motion to Exclude Evidence Under 37 C.F.R. 42.64(c)", *Nabors Drilling Technologies USA, Inc.*, Petitioner, V. *Motive Drilling Technologies, Inc.*, Patent Owner, Mar. 16, 2023, 18 pages.
IPR2022-00289, "Petitioner's Reply to Patent Owner's Opposition to Petitioner's Motion to Exclude Evidence Under 37 C.F.R. 42.64(c)", *Nabors Drilling Technologies USA, Inc.*, Petitioner, V. *Motive Drilling Technologies, Inc.*, Patent Owner, Mar. 30, 2023, 8 pages.
IPR2022-00289, "Petitioner's Reply to Patent Owner's Response", *Nabors Drilling Technologies USA, Inc.*, Petitioner, V., *Motive Drilling Technologies, Inc.*, Paper 22, Jan. 26, 2023, 39 pages.
IPR2022-00289, "Petitioner's Updated Exhibit List", *Nabors Drilling Technologies USA, Inc.*, Petitioner, V. *Motive Drilling Technologies, Inc.*, Patent Owner, Apr. 18, 2023, 6 pages.
IPR2022-00289, "Plaintiff Nabors Drilling Technologies USA, Inc.'s Preliminary Election of Asserted Prior Art", 4 pages.
IPR2022-00289, "Plaintiff Nabors Drilling Technologies USA, Inc.'s Preliminary Invalidity Contentions Pursuant To Patent Local Rules 3-3 & 3-4", 28 pages.
IPR2022-00289, "Plaintiff Nabors Drilling Technologies USA, Inc.'s Responsive Claim Construction Brief—Part 1", 3:20-cv-03126, Document 91, Aug. 19, 2021, 559 pages.
IPR2022-00289, "Plaintiff Nabors Drilling Technologies USA, Inc.'s Responsive Claim Construction Brief—Part 2", 3:20-cv-03126, Document 91, Aug. 19, 2021, 537 pages.
IPR2022-00289, "Record of Oral Hearing", *Nabors Drilling Technologies USA, Inc.*, Petitioner, V. *Motive Drilling Technologies, Inc.*, Patent Owner, Apr. 20, 2023, 65 pages.
IPR2022-00289, "Supplemental Declaration of Dr. Schubert", *Nabors Drilling Technologies USA, Inc.*, Petitioner, V., *Motive Drilling Technologies, Inc.*, Exhibit 1028, Jan. 25, 2023, 16 pages.
Moore, "Drilling Practices Manual", The Petroleum Publishing Co., Tulsa, 1974, 59 pages.
MX/A/2015/017673, "Notice of Allowance", Oct. 5, 2021, 3 pages.
MX/A/2015/017673, "Office Action", Jan. 6, 2021, 14 pages.
PCT/US2014/043900, "International Preliminary Report on Patentability", Jan. 7, 2016, 7 pages.
PCT/US2014/043900, "International Search Report and Written Opinion", Oct. 22, 2014, 9 pages.
Perneder, "A Three-Dimensional Mathematical Model of Directional Drilling", University of Minnesota Ph.D. Dissertation, Jan. 2013, 24 pages.
PGR2022-0005, "Comparison Chart", *Nabors Drilling Technologies USA, Inc.* Petitioner, V. *Motive Drilling Technologies, Inc.*, Exhibit 1007, 3 pages.
PGR2022-0005, "Decision Granting Institution of Post-Grant Review", *Nabors Drilling Technologies USA, Inc. v. Motive Drilling Technologies, Inc.*, Paper 9, 49 pages.

(56) References Cited

OTHER PUBLICATIONS

PGR2022-0005, "File History of U.S. Appl. No. 16/906,571", Exhibit 1002, 552 pages.
PGR2022-0005, "Patent Owner Preliminary Response", *Nabors Drilling Technologies USA, Inc. v. Motive Drilling Technologies, Inc.*, Paper 8, 89 pages.
PGR2022-00055, "Appendix 1 to the Oct. 2019 Update: Subject Matter Eligibility Life Sciences and Data Processing Examples", *Nabors Drilling Technologies USA, Inc.*, Petitioner, V. *Motive Drilling Technologies, Inc.*, Patent Owner, Motive Exhibit, Exhibit 2009, Oct. 2019, 41 pages.
PGR2022-00055, "Declaration of Jerome J. Schubert Ph.d., PE, Under 37 C.F.R§ 1.68 in Support of Petition for Inter Partes Review of U.S. Pat. No. 11,170,454", *Nabors Drilling Technologies USA, Inc.* Petitioner, V. *Motive Drilling Technologies, Inc.*, Exhibit 1003, Aug. 8, 2022, 171 pages.
PGR2022-00055, "Declaration of L. Brun Hilbert, Jr., Ph.D., P.E.", *Nabors Drilling Technologies USA, Inc.*, Petitioner, V. *Motive Drilling Technologies, Inc.*, Patent Owner, Exhibit 2001, Jun. 23, 2023, 162 pages.
PGR2022-00055, "Declaration of Stacie Schmidt, Under 37 C.F.R§ 1.68 in Support of Petition For Post Grant Review of U.S. Pat. No. 11,170,454", *Nabors Drilling Technologies USA, Inc.* Petitioner, V. *Motive Drilling Technologies, Inc.*, Exhibit 1037, Aug. 5, 2022, 152 pages.
PGR2022-00055, "Deposition Transcript of L. Brun Hilbert", *Nabors Drilling Technologies USA, Inc.*, Petitioner, V. *Motive Drilling Technologies, Inc.*, Patent Owner, Exhibit 1044, Sep. 14, 2023, 60 pages.
PGR2022-00055, "Hearing Transcript", *Nabors Drilling Technologies USA, Inc.*, Petitioner, V. *Motive Drilling Technologies, Inc.*, Patent Owner, Jan. 29, 2024, 50 pages.
PGR2022-00055, "Judgment Final Written Decision Determining All Challenged Claims Unpatentable", *Nabors Drilling Technologies USA, Inc.*, Petitioner, V. *Motive Drilling Technologies, Inc.*, Patent Owner, Feb. 22, 2024, 60 pages.
PGR2022-00055, "Order Trial Hearing", *Nabors Drilling Technologies USA, Inc.*, Petitioner, V. *Motive Drilling Technologies, Inc.*, Patent Owner, Nov. 7, 2023, 10 pages.
PGR2022-00055, "Patent Owner Response", *Nabors Drilling Technologies USA, Inc.*, Petitioner, V. *Motive Drilling Technologies, Inc.*, Patent Owner, Jun. 23, 2023, 108 pages.
PGR2022-00055, "Patent Owner's Demonstratives", *Nabors Drilling Technologies USA, Inc.*, Petitioner, V. *Motive Drilling Technologies, Inc.*, Patent Owner, Exhibit 2010, Dec. 13, 2023, 89 pages.
PGR2022-00055, "Patent Owner's Request for Oral Argument", *Nabors Drilling Technologies USA, Inc.*, Petitioner, V. *Motive Drilling Technologies, Inc.*, Patent Owner, Oct. 30, 2023, 4 pages.
PGR2022-00055, "Patent Owner's Sur-Reply", *Nabors Drilling Technologies USA, Inc.*, Petitioner, v. *Motive Drilling Technologies, Inc.*, Patent Owner, Nov. 3, 2023, 33 pages.
PGR2022-00055, "Patent Owner's Updated Exhibit List", *Nabors Drilling Technologies USA, Inc.*, Petitioner, V. *Motive Drilling Technologies, Inc.*, Patent Owner, Dec. 6, 2023, 3 pages.
PGR2022-00055, "Petition for Post-grant Review of U.S. Pat. No. 11,170,454", *Nabors Drilling Technologies USA, Inc. v. Motive Drilling Technologies, Inc.*, Paper 3, 114 pages.
PGR2022-00055, "Petitioner's Errata Sheet for the Sep. 14, 2023 Deposition Transcript of L. Brun Hilbert, Jr. Ph.D., PE", *Nabors Drilling Technologies USA, Inc.*, Petitioner, V. *Motive Drilling Technologies, Inc.*, Patent Owner, Exhibit 1045, Sep. 20, 2023, 3 pages.
PGR2022-00055 et al., "Petitioner's Oral Argument Demonstratives", *Nabors Drilling Technologies USA, Inc.*, Petitioner, V. *Motive Drilling Technologies, Inc.*, Patent Owner, Exhibit 1046, Dec. 13, 2023, 41 pages.
PGR2022-00055, "Petitioner's Reply to Patent Owner's Response", *Nabors Drilling Technologies USA, Inc.*, Petitioner, V. *Motive Drilling Technologies, Inc.*, Patent Owner, Sep. 22, 2023, 30 pages.
PGR2022-00055, "Petitioner's Request for Oral Argument", *Nabors Drilling Technologies USA, Inc.*, Petitioner, V. *Motive Drilling Technologies, Inc.*, Patent Owner, Oct. 31, 2023, 4 pages.
PGR2022-00055, "Petitioners Updated Exhibit List", *Nabors Drilling Technologies USA, Inc.*, Petitioner, V. *Motive Drilling Technologies, Inc.*, Patent Owner, Dec. 6, 2023, 6 pages.
PGR2022-00055, "Transcript of Deposition of Jerome J.", *Nabors Drilling Technologies USA, Inc.*, Petitioner, V. *Motive Drilling Technologies, Inc.*, Patent Owner Exhibit 2002, Jun. 8, 2023, 126 pages.
Robinson et al., "Operator Demands for Repeatability, Predictability Lead Contractors to Push Ahead on Horsepower Pressure Ratings, Hookload and Pipe-racing Capacity While Adding Smart, Data-analytic Functions to Control Systems", IPR2022-00288, Exhibit 2018, Aug. 23, 2018, 15 pages.
Saputelli et al., "Real-Time Decision-Making for Value Creation While Drilling", Society of Petroleum Engineers/International Association of Drilling Contractors Middle East Drilling Technology Conference and Exhibition, Oct. 2003, pp. 1-19.
Zborowski, "Refined Business, Software Platforms Drive Helmerich & Payne's Drilling Evolution", Exhibit 2015, IPR2022-00288, Nov. 18, 2018, 4 pages.

\* cited by examiner

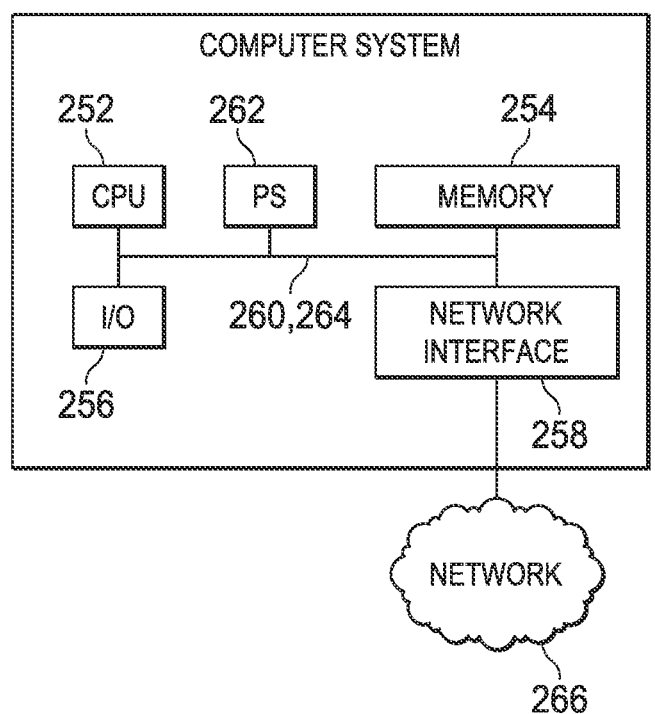

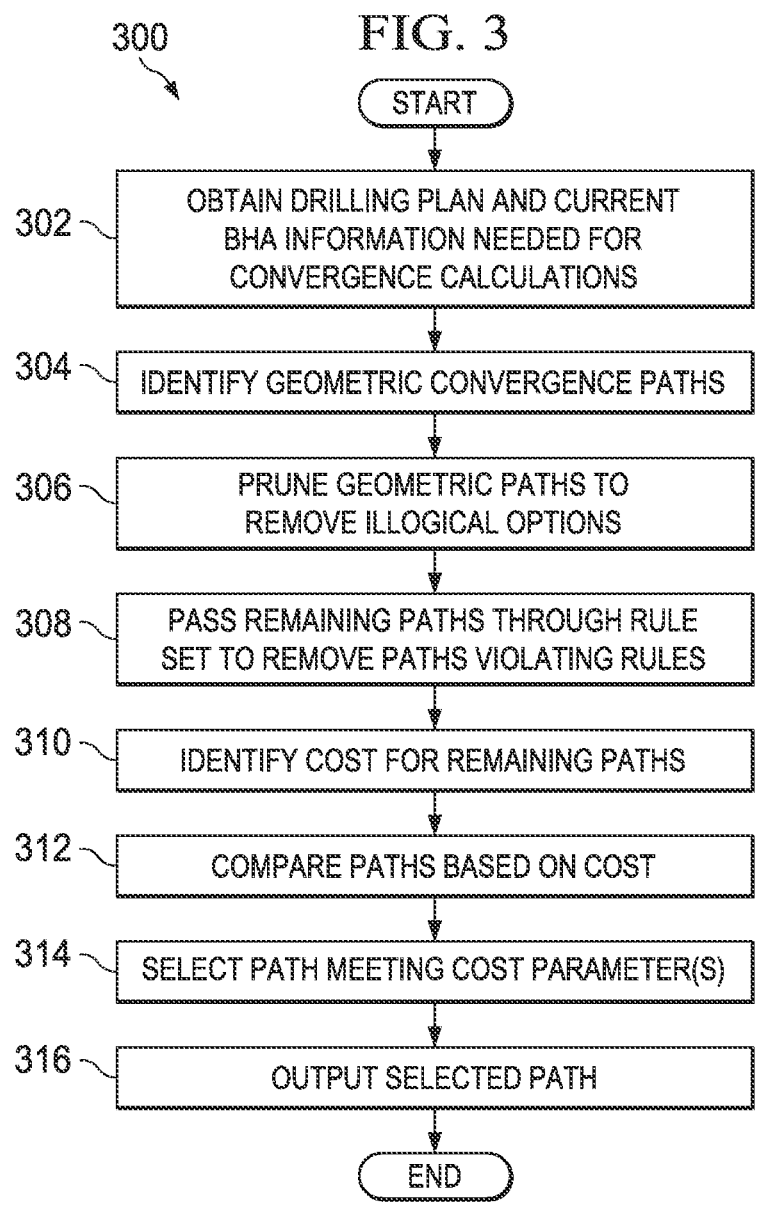

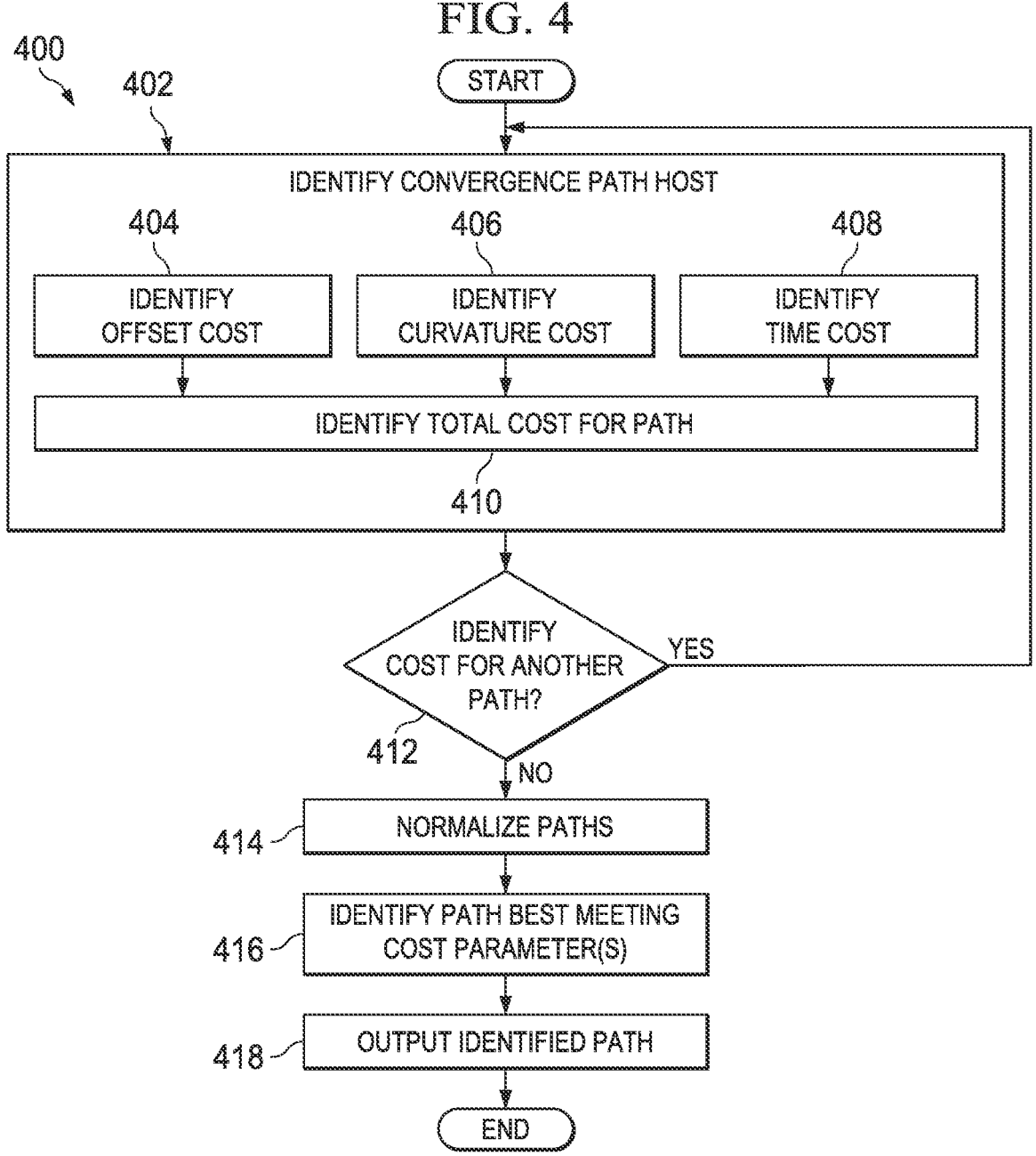

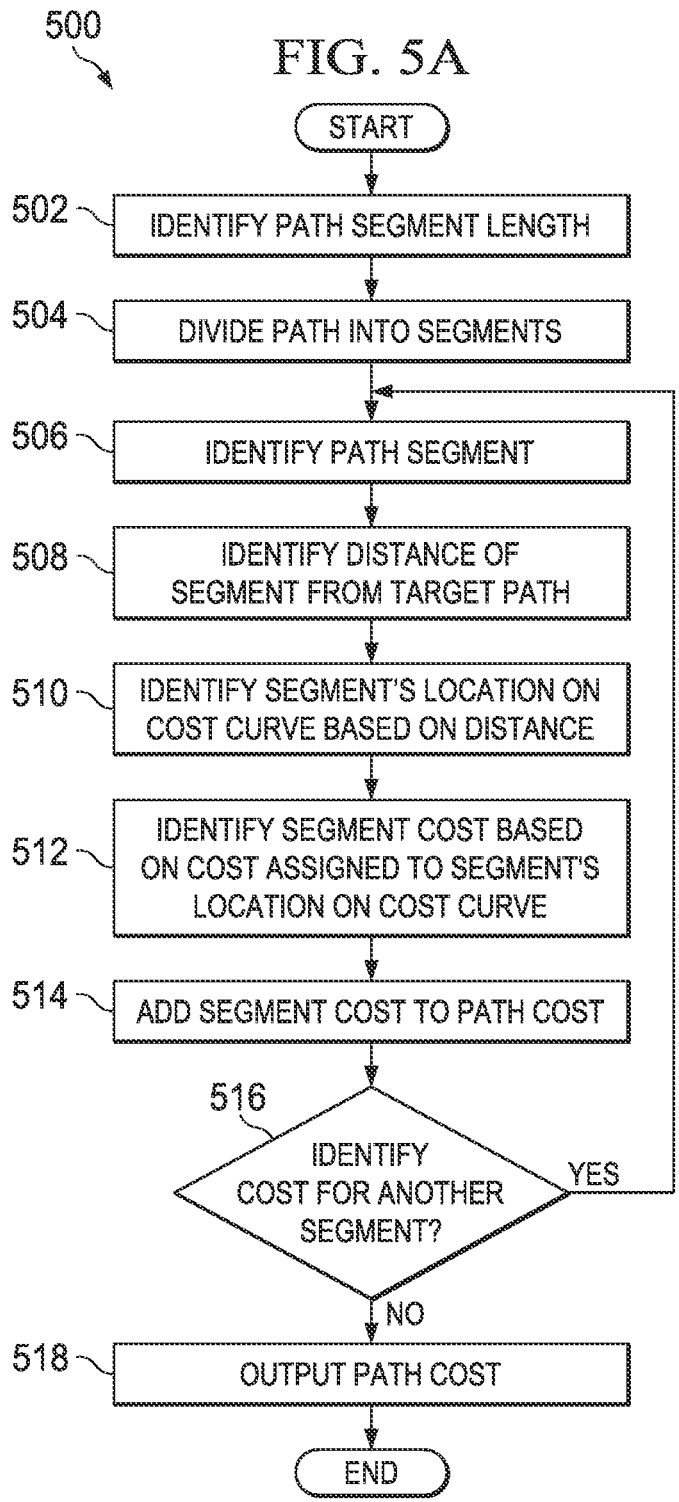

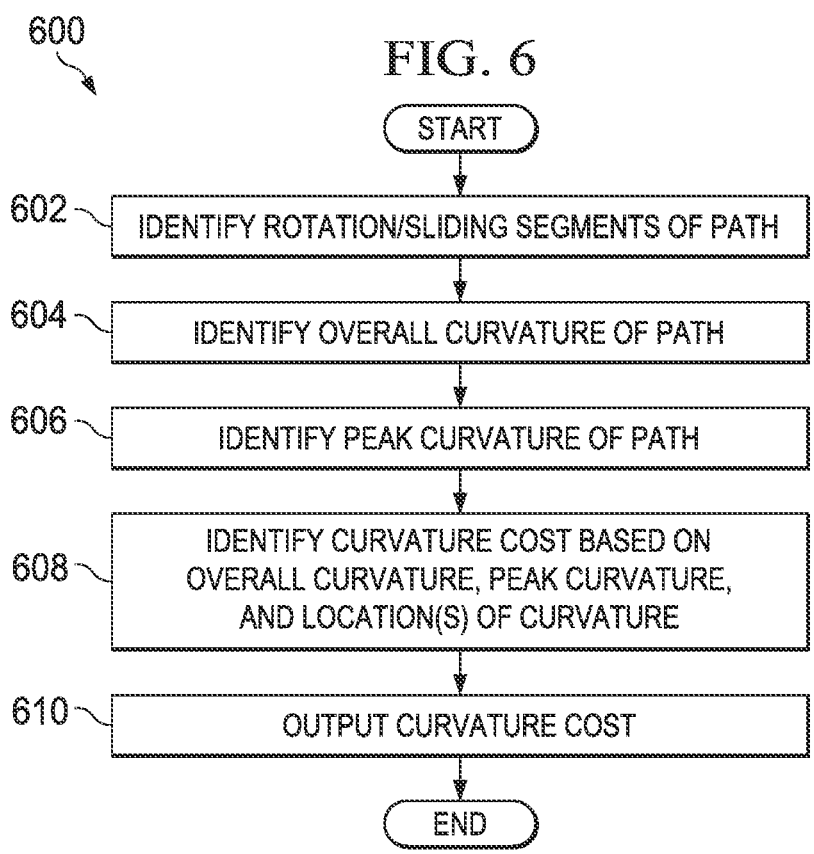

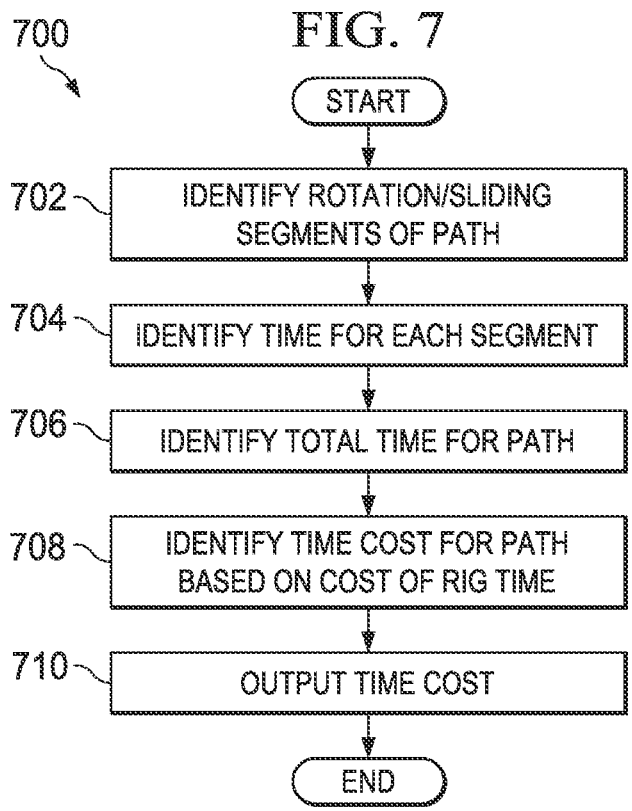
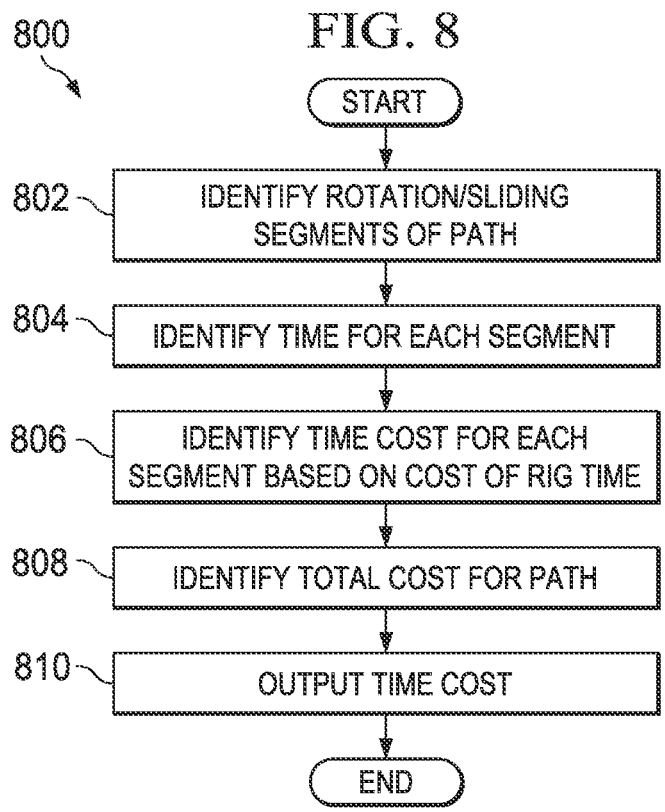

SYSTEMS AND METHODS FOR DRILLING A WELL

CROSS-REFERENCES TO RELATED APPLICATIONS

This application is a continuation and claims the benefit of priority of U.S. patent application Ser. No. 18/452,249, filed Aug. 18, 2023, entitled "SYSTEMS AND METHODS FOR DRILLING A WELL", which is a continuation and claims the benefit of priority of U.S. patent application Ser. No. 17/449,707, filed Oct. 1, 2021, entitled "SYSTEMS AND METHODS FOR DRILLING A WELL", which is a continuation and claims the benefit of priority of U.S. patent application Ser. No. 16/906,571, filed Jun. 19, 2020, entitled "SYSTEMS AND METHODS FOR DRILLING A WELL", which is a continuation and claims the benefit of priority of U.S. patent application Ser. No. 15/836,563, filed Dec. 8, 2017 entitled "SYSTEM FOR DRILLING A SELECTED CONVERGENCE PATH," which is a continuation and claims the benefit of priority of U.S. patent application Ser. No. 15/180,661, filed Jun. 13, 2016, entitled "SYSTEM AND METHOD FOR DEFINING A DRILLING PATH BASED ON COST," which is a continuation of U.S. patent application Ser. No. 14/660,298, filed Mar. 17, 2015, entitled SYSTEM AND METHOD FOR SELECTING A DRILLING PATH BASED ON COST, which is a continuation and claims the benefit of priority of U.S. patent application Ser. No. 14/067,390, filed Oct. 30, 2013, entitled SYSTEM AND METHOD FOR DEFINING A DRILLING PATH BASED ON COST, which claims the benefit of U.S. Provisional Application No. 61/839,731, filed Jun. 26, 2013, and entitled SYSTEM AND METHOD FOR SELECTING A DRILLING PATH BASED ON COST, the specifications of each of which are incorporated herein by reference in their entirety.

TECHNICAL FIELD

The following disclosure relates to directional and conventional drilling.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Current technologies and methods do not adequately address the complicated nature of drilling. Accordingly, what is needed are a system and method to improve drilling operations.

BRIEF DESCRIPTION OF THE DRAWINGS

For a more complete understanding, reference is now made to the following description taken in conjunction with the accompanying Drawings in which:

FIG. 2B illustrates one embodiment of a computer system that may be used within the environment of FIG. 2A;

FIG. 3 illustrates a flow chart of one embodiment of a method that may be used to select one of a plurality of convergence paths based on cost;

FIG. 4 illustrates a flow chart of one embodiment of a method that may be used with the method of FIG. 3 to identify the cost of a convergence path;

FIG. 5A illustrates a flow chart of one embodiment of a method that may be used with the method of FIG. 4 to identify the offset cost of a convergence path;

FIG. 6 illustrates a flow chart of one embodiment of a method that may be used with the method of FIG. 4 to identify the curvature cost of a convergence path; and FIGS. 7 and 8 illustrate flow charts of different embodiments of a method that may be used with the method of FIG. 4 to identify the time cost of a convergence path.

DETAILED DESCRIPTION OF THE INVENTION

Figure 1:
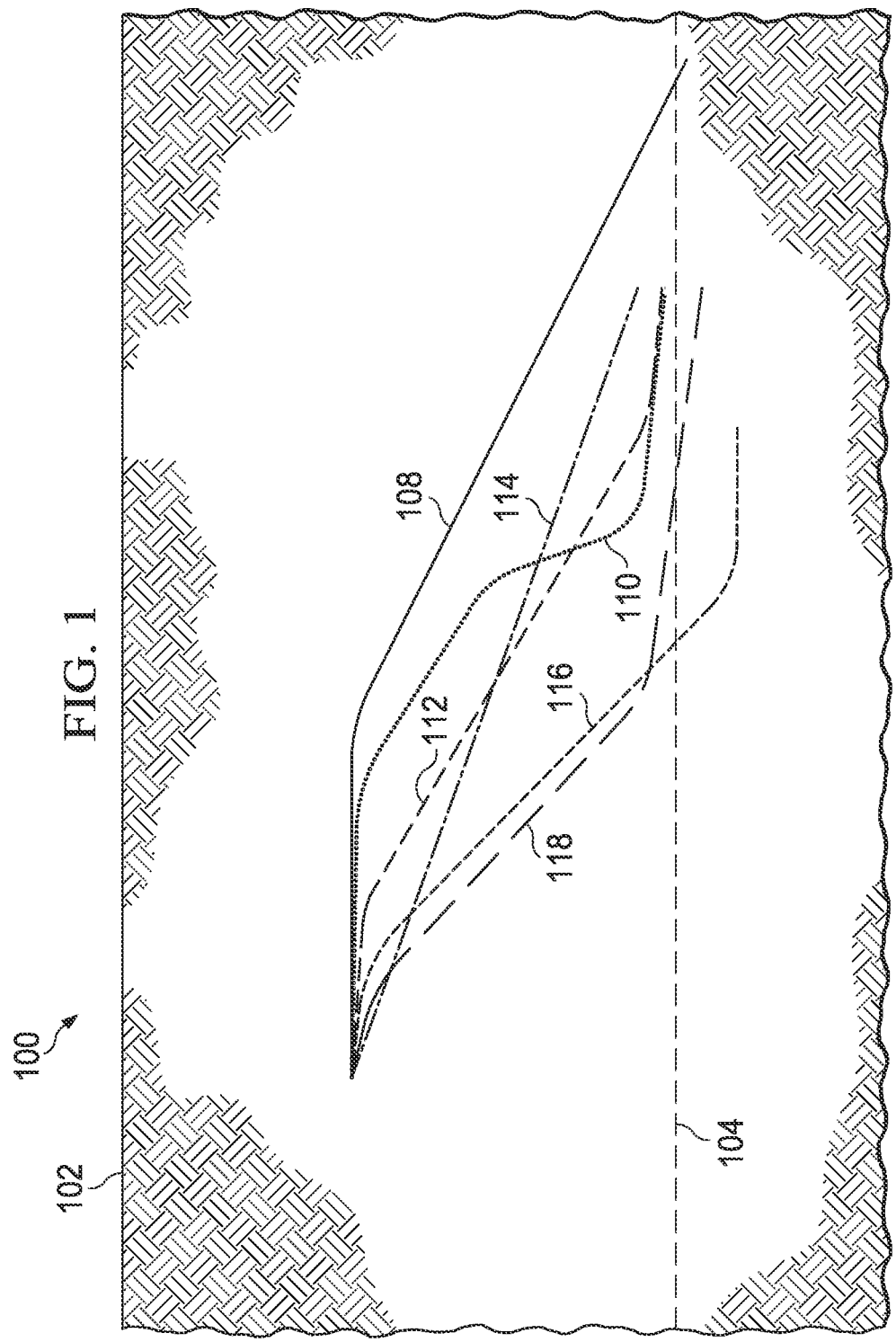
FIG. 1 illustrates one embodiment of an environment within which various aspects of the present disclosure may be implemented.

Referring now to the drawings, wherein like reference numbers are used herein to designate like elements throughout, the various views and embodiments of a system and method for selecting a drilling path based on cost are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1, one embodiment of an environment 100 is illustrated with a formation 102. A borehole is to be drilled or is being drilled within the formation 102 and there is a target path 104 for the borehole. Calculating paths for a borehole in a formation is a complex and often difficult to understand process that frequently uses a combination of known factors and estimates. Whether calculating the path prior to the beginning of drilling or attempting to return to a desired path when drilling has gone off course, there are an infinite number of paths from which to choose. Each of these paths has an associated financial cost that is difficult to identify due to the number of factors involved. However, the financial cost of a path is important to the business of drilling and needs to be taken into account. Accordingly, by normalizing drilling variables into a monetary unit (e.g., United States dollars) as described in the present disclosure, multiple path options can be evaluated in terms of financial cost and the path that best satisfies one or more defined cost parameters can be selected.

In the present example, the target path 104 represents an optimal path that has zero cost and provides maximum value. In other words, following the target path 104 has no penalty as there is no "better" way to drill through the formation 102 than along the target path 104. It is understood that "better" is a relative term that may be based on various selected factors, imperfect data and/or conclusions, and/or available equipment, and so may not be the actual best possible path if other factors were selected, additional information was known, and/or if other equipment was available. In terms of cost, the target path 104 has zero cost because there is no penalty for being on target. In other words, while there is a drilling cost associated with the target path 104 because the target path 104 cannot be drilled for free, the target path 104 is assigned zero cost in the present example because the cost of the target path 104 is the baseline cost and only paths that stray from the target path 104 will be assigned cost penalties. The target path 104 may be defined by a well plan, seismic data, and/or any other information suitable for delineating the path through the formation 102.

For purposes of example, paths 108, 110, 112, 114, 116, and 118 illustrate possible convergence paths from a point 106 representing a current or future bottom hole assembly (BHA) location to the target path 104. Although not discussed in detail herein, the calculation of the convergence paths themselves may use any of a number of processes. One possible method for such convergence path calculations is disclosed in U.S. application Ser. No. 13/530,298, filed on Jun. 22, 2012, and entitled SYSTEM AND METHOD FOR DETERMINING INCREMENTAL PROGRESSION BETWEEN SURVEY POINTS WHILE DRILLING, which is hereby incorporated by reference in its entirety.

As will be discussed below, after the paths 108, 110, 112, 114, 116, and 118 are calculated, each path may be assigned a cost and then evaluated based on that cost relative to the costs of the other paths. For example, from a distance perspective, path 108 has a greater length than path 116 and much of that length is farther from the target path 104 than the length of path 110. In contrast, path 110 narrows the distance to the target path 104 more rapidly. However, path 110 requires more sliding, which takes time and introduces complexities in steering. These factors and/or others need to be weighed to determine whether the shorter length of path 110 actually results in a lower cost. Paths 108 and 116 converge sharply with the target path 104 and it appears likely that overshoot will occur unless an unrealistic build rate is applied. Path 114 may converge sharply, but does not extend far enough to determine what will happen. Paths 110, 112, and 118 offer more reasonable convergence angles, although some correction may still need to be made. The paths 108, 110, 112, 114, 116, and 118 offer various alternatives, each with different curvature, length, offset from the target path 104, and time considerations that affect the cost of that particular path. To address costs beyond the point of convergence, each path may also have an extension cost, which will be discussed in greater detail below.

By calculating a monetary value (e.g., a value in United States dollars) for a particular segment of a path (e.g., a unit of measure such as a foot) and adding up all the segments for the path, a cost can be identified for a particular path. For example, assume that the target path has a value of $1000 per foot based on a PV10 value (e.g., the present value of estimated future oil and gas revenues, net of estimated direct expenses, discounted at an annual discount rate of 10%). The target path 104 would be $0 per foot in cost. A cost for a convergence path can then be calculated for each segment (e.g., foot) of the convergence path based on the target path's value, and the total cost of all the segments is the cost of the convergence path.

The process of calculating the cost of a path may involve identifying any of a number of different types of cost, such as a distance cost, a sliding cost, a curvature cost, a time cost, a dogleg cost, a deviation cost, and/or a launch penalty cost. Some of these costs may be used to calculate other costs. For example, the launch penalty cost may be used to calculate the curvature cost.

Accordingly, the present disclosure may be used to provide a relatively easy to understand picture of which path should be selected from many different possible paths from a cost standpoint. For example, if the borehole is being drilled and the BHA is off of the target path, a cost comparison may be used to determine the best convergence path in terms of cost for returning the BHA to the target path when there are an infinite number of paths from which to choose. As the best convergence path may not be the shortest or most direct path, using a cost based selection analysis enables drilling decisions to be based on maximizing value and minimizing cost.

Although FIG. 1 is a two-dimensional drawing, it is understood that the various paths illustrated in FIG. 1 may be three-dimensional in nature. Furthermore, it is understood that although various lines are illustrated as straight lines for purposes of clarity (e.g., the target path 104), such lines need not be straight. Furthermore, although shown as lines, it is understood that paths may be zones. For example, the target path 104 may be a three dimensional zone and drilling inside the zone may be assigned zero cost.

Figure 2A:
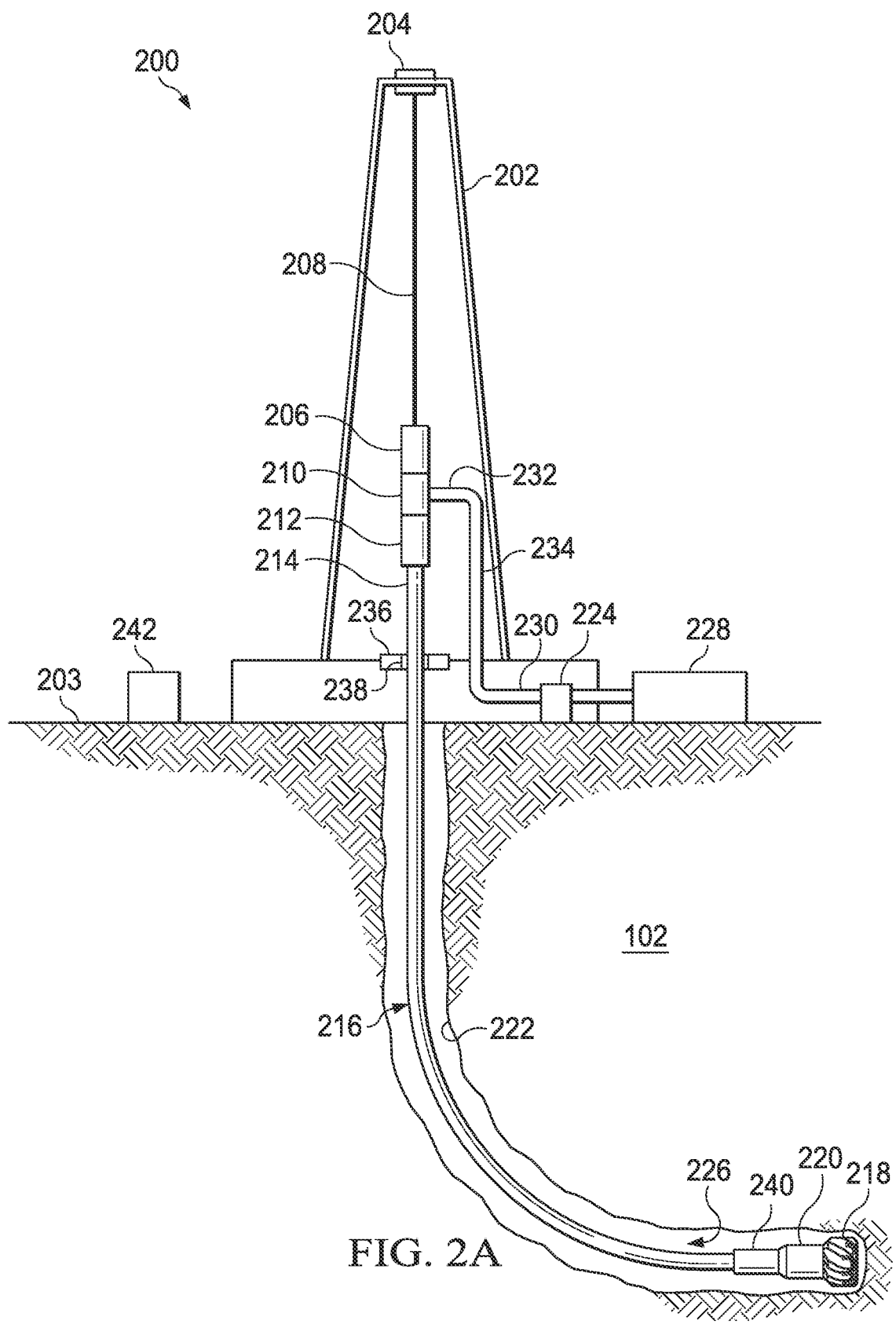
FIG. 2A illustrates one embodiment of a drilling system that may be used within the environment of FIG. 1.

Referring to FIG. 2A, one embodiment of a drilling environment 200 is illustrated that may be used within the environment of FIG. 1. Although the environment 200 is a drilling environment that is described with a top drive drilling system, it is understood that other embodiments may include other drilling systems, such as rotary table systems.

In the present example, the environment 200 includes a derrick 202 on a surface 203. The derrick 202 includes a crown block 204. A traveling block 206 is coupled to the crown block 204 via a drilling line 208. In a top drive system (as illustrated), a top drive 210 is coupled to the traveling block 206 and provides the rotational force needed for drilling. A saver sub 212 may sit between the top drive 210 and a drill pipe 214 that is part of a drill string 216. The top drive 210 rotates the drill string 216 via the saver sub 212, which in turn rotates a drill bit 218 of a BHA 220 in a borehole 222 in the formation 102. A mud pump 224 may direct a fluid mixture (e.g., mud) 226 from a mud pit or other container 228 into the borehole 222. The mud 226 may flow from the mud pump 224 into a discharge line 230 that is coupled to a rotary hose 232 by a standpipe 234. The rotary hose 232 is coupled to the top drive 210, which includes a passage for the mud 226 to flow into the drill string 216 and the borehole 222. A rotary table 236 may be fitted with a master bushing 238 to hold the drill string 216 when the drill string is not rotating.

Some or all of a control system 242 may be located at the derrick 202, may be downhole, and/or may be remote from the actual drilling location. For example, the control system 242 may be a system such as is disclosed in U.S. Pat. No. 8,210,283 entitled SYSTEM AND METHOD FOR SURFACE STEERABLE DRILLING, filed on Dec. 22, 2011, and issued on Jul. 3, 2012, which is hereby incorporated by reference in its entirety. Alternatively, the control system 242 may be a standalone system or may be incorporated into other systems at the derrick 202. The control system 242 may communicate via a wired and/or wireless connection (not shown).

Referring to FIG. 2B, one embodiment of a computer system 250 is illustrated. The computer system 250 is one possible example of a system component or device such as the control system 242 of FIG. 2A or a separate system used to perform the various processes described herein. In scenarios where the computer system 250 is on-site, such as within the environment 100 of FIG. 1, the computer system may be contained in a relatively rugged, shock-resistant case that is hardened for industrial applications and harsh environments. It is understood that downhole electronics may be mounted in an adaptive suspension system that uses active dampening as described in various embodiments herein.

The computer system 250 may include a central processing unit ("CPU") 252, a memory unit 254, an input/output ("I/O") device 256, and a network interface 258. The components 252, 254, 256, and 258 are interconnected by a transport system (e.g., a bus) 260. A power supply (PS) 262 may provide power to components of the computer system 250 via a power transport system 264 (shown with data transport system 260, although the power and data transport systems may be separate).

It is understood that the computer system 250 may be differently configured and that each of the listed components may actually represent several different components. For example, the CPU 252 may actually represent a multiprocessor or a distributed processing system; the memory unit 254 may include different levels of cache memory, main memory, hard disks, and remote storage locations; the I/O device 256 may include monitors, keyboards, and the like; and the network interface 258 may include one or more network cards providing one or more wired and/or wireless connections to a network 266. Therefore, a wide range of flexibility is anticipated in the configuration of the computer system 250.

The computer system 250 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 250. The operating system, as well as other instructions (e.g., software instructions for performing the functionality described in previous embodiments) may be stored in the memory unit 254 and executed by the processor 252. For example, the memory unit 254 may include instructions for performing the various methods and control functions disclosed herein.

The network 266 may be a single network or may represent multiple networks, including networks of different types. For example, the network 266 may include one or more cellular links, data packet networks such as the Internet, local area networks (LANs), and/or wide local area networks (WLAN), and/or Public Switched Telephone Networks (PSTNs). Accordingly, many different network types and configurations may be used to couple the computer system 250 to other components of the environment 200 of FIG. 2A and/or to other systems not shown (e.g., remote systems).

Referring to FIG. 3, one embodiment of a method 300 illustrates a process that may be used to select a convergence path from multiple possible convergence paths when a BHA (e.g., the BHA 220 of FIG. 2A) is off a target path (e.g., the target path 104 of FIG. 1). In the three dimensional space of a formation (e.g., the formation 102 of FIG. 1), there may be an infinite number of possible convergence paths. The method 300 may be used to identify multiple possible convergence paths, narrow the identified paths to a single "best" path based on cost, and select that path as the path to be used.

It is understood that "best" is a relative term that may be based on one or more parameters, and so may not be the best path if other parameters are selected. In the present example, the best path is the lowest cost path in terms of a monetary unit, but it is understood that the best path may be otherwise defined. For example, in some embodiments, the best path may be the second to lowest cost path or may be the lowest cost path based on a particular cost parameter (e.g., time cost). Accordingly, while the best path is the path with the lowest overall cost for purposes of example, other best paths may exist and may be selected based on the particular needs for a path.

In step 302, drilling plan information is obtained for convergence solution calculations if it has not already been obtained. The drilling plan information may be a well plan, seismic data, and/or any other information that defines the target path 104 that the BHA 220 is to follow. Current BHA information such as location, trajectory, ROP, and other information may also be obtained so that a convergence plan can be calculated to realign the BHA with the target path 104. Other information, such as drift information, may be obtained if not included in the drilling plan information for use in sliding and/or rotation calculations.

In step 304, multiple geometric paths are calculated. The number of geometric paths that are calculated may depend on factors such as available processing power and/or the number and/or values of selected parameters (e.g., parameters may be selected to constrain the number of geometric paths). For example, parameters may limit the minimum and/or maximum length of a path, the maximum allowable dogleg severity, the direction, the inclination, and/or other path variables. The total number of paths may be limited by selecting appropriate parameters and parameter values. For purposes of example, 500,000 paths may be calculated, but it is understood that fewer or more (e.g., one million or more) paths may be calculated in other embodiments.

In step 306, the geometric paths are pruned to remove illogical options. For example, while geometrically possible, some paths may go in the wrong direction at some point and yet still converge. These paths can be eliminated as they are not likely to be the lowest cost solution. In some embodiments, step 306 may be handled as parameters used in step 304 (e.g., parameters may be selected that remove the possibility of calculating paths that go in the wrong direction). The pruning of step 306 reduces the number of paths for which later calculations are needed. This may speed up calculations, thereby providing a performance benefit.

In step 308, the paths remaining after the pruning of step 306 are passed through a rule set and paths violating the rules are removed from consideration. For example, one or more rules may define a threshold for maximum allowable dogleg severity. Any paths that have doglegs above the threshold may be discarded. One or more other rules may define a threshold for a maximum allowable curvature for the entire path and any paths having an overall curvature above the threshold may be discarded. The rule set may be used to provide a relatively fine level of control and/or may be used to test different outcomes without having to redo the pruning of step 306.

It is understood that the method 300 may handle steps 304, 306, and 308 in different ways depending on how the method 300 is implemented, and that steps 304, 306, and/or 308 may overlap or be combined in some embodiments. For example, as described previously, parameters may be used in step 304 to constrain the identification of the geometric convergence paths. Accordingly, the pruning of step 306 and rule set application of step 308 may vary depending on the functionality provided by step 304. Generally, steps 306 and/or 308 provide the ability to refine the selection process for deciding which geometric convergence paths are to be passed on for cost analysis.

In step 310, a cost may be identified for each path remaining after step 308. As will be described later in greater detail, the cost of a path may be dependent on various factors such as an offset cost that penalizes a path based on distance from the target path, a curvature cost that penalizes a path for the path's curvature (which has an impact on friction), and/or a time cost that penalizes a path based on the amount of time the path will take. For purposes of example, all three of these costs are used to calculate the total cost for a path, but it is understood that fewer factors may be used in some embodiments, and that more factors may be used in other embodiments.

In step 312, the paths are compared based on cost and, in step 314, the path that best meets one or more defined cost parameters is selected. For example, the lowest cost path may be selected. In step 316, the selected path is output. Although not shown in FIG. 3, the output may be used to provide drilling instructions for directing the BHA back to the target path. For example, the output may be used with the control system described in previously incorporated U.S. Pat. No. 8,210,283 (SYSTEM AND METHOD FOR SURFACE STEERABLE DRILLING) to provide or otherwise form the basis for drilling instructions.

It is understood that various steps may be added or removed from FIG. 3. For example, in some embodiments, the method 300 may import previously calculated geometric convergence paths (removing the need for steps 302 and 304). In other embodiments, those imported paths may have already been pruned (removing the need for step 306) and/or passed through the rule set (removing the need for step 308).

Referring to FIG. 4, one embodiment of a method 400 illustrates a process that may be used to identify the cost of multiple convergence paths and then select one of the paths. In the present example, the cost of a path is based on the offset cost, the curvature cost, and the time cost as described above.

In step 402, the cost for a convergence path is identified. More specifically, the offset cost is identified in step 404, the curvature cost is identified in step 406, and the time cost is identified in step 408. It is understood that identifying the offset cost, the curvature cost, and the time cost may involve two or more calculations for each cost. For example, the offset cost, the curvature cost, and/or the time cost may be identified from both an azimuth perspective and a true vertical depth (TVD) perspective. These two dimensional costs may then be added together to identify a single offset cost. In other embodiments, three dimensional calculations may be used to determine the offset cost. Examples of steps 404, 406, and 408 are described in greater detail below. In step 410, the outputs of steps 404, 406, and 408 are combined to identify the total cost for the path.

In step 412, a determination may be made as to whether the cost of another path is to be identified. If the cost of another path is to be identified, the method 400 returns to step 402 and calculates the cost of the next path. If no path remains for which the cost is to be calculated, the method 400 continues to step 414, where the paths are normalized.

Normalization may be performed because the paths may not be the same length due to factors such as differences in the timing and length of rotation and sliding segments. The present embodiment may use rotate/slide pairs for purposes of calculations, although each pair may have a zero factor where there is either zero rotation or zero sliding. This means that two rotations or two slides may be chained together directly if the intervening segment is zero. The present embodiment may have minimum and maximum path lengths defined for the geometric search engine and a path may not stop on convergence. It is understood that convergence does not necessarily mean that the path actually merges with the target path 104.

Not stopping on convergence means that the path may continue after convergence, which extends the length of the path. This extension has a cost that may be calculated separately from the path cost and may be used in comparing paths to identify the least cost path. For example, referring to FIG. 1, each path 108, 110, 112, 114, 116, and 118 is extended past the planned convergence path. As discussed previously, paths 108 and 118 converge sharply (e.g., aggressively) with the target path 104, while paths 110, 112, and 118 offer more reasonable (e.g., less aggressive) convergence angles, although some correction may still need to be made. Accordingly, by extending the paths past convergence, paths with higher backend loaded costs may be identified. For example, path 108 may need a significant amount of correction to deal with the amount of overshoot caused by the aggressive convergence angle, while path 118 needs much less correction. By calculating the extension cost as well as the path cost, a more complete cost picture can be formed.

A path may be defined in terms of vertical zones, build zones, and lateral zones, with each zone having its own set of rules. For example, a build zone may have a maximum allowed curvature of fourteen degrees, while a lateral zone may have a maximum allowed curvature of four degrees. Due to geological factors such as drift, drilling a path as a straight line may not actually result in a straight line because rotational drilling has a tendency to curve due to drift. When formulating and reviewing plans, the geological drift may be accounted for by drilling somewhat off course relative to a straight line path and/or by planning corrective slides. Drifting may impose a cost when it causes undesirable deviations from the plan and may also require a cost for any corrections needed to account for the drift. Furthermore, a path may use geological drift (if present in the formation) to account for sliding time and other corrective measures (e.g., may allow the drift to correct the course instead of performing a slide). However, if the amount of drift results in a course correction that is too slow and/or occurs over too great a distance, the drift correction may not occur fast enough to negate the offset cost.

Accordingly, to balance these and other factors, the paths may use empirical geo-drift, ROP, and build rates (e.g., motor yields) to calculate convergence. Due to the many different factors present in a path (e.g., amount of progress made by a path), paths of different lengths (e.g., a three hundred foot path versus a four hundred foot path) may be normalized prior to comparison. For example, one path may be more expensive than another path, but the more expensive path may have made an additional fifty feet of progress compared to the cheaper path. This additional fifty feet of progress has positive value in terms of cost that is not taken into account if the paths are not normalized. This is illustrated in FIG. 1 with respect to paths 108 and 118, for example, with path 108 converging at a point farther down the target path 104 than the point at which path 118 converges.

In the present example, the normalization process is performed by normalizing all paths against the longest path as follows: (cost of path being normalized/length of path being normalized)*length of longest path. For example, if the longest path is four hundred feet long and the path being normalized is two hundred feet long and costs $75,000, the normalization would result in (($75,000/200)*400=$150,000). The total cost of the two hundred foot path used for comparison purposes would be $150,000, instead of the actual $75,000 cost. The four hundred foot plan will more expensive if its cost is greater than $150,000, and less expensive if its cost is less than $150,000. Accordingly, a cost of $125,000 for the four hundred foot path would make the four hundred foot path more expensive than the two hundred foot path prior to normalization, but less expensive after normalization is performed.

In step 416, following normalization, the path best meeting the cost parameter(s) is identified. For example, the lowest cost path may be identified. In step 418, the identified path is output. It is understood that steps 416 and 418 may be similar or identical to steps 316 and 318 of FIG. 3, but are included for purposes of better illustrating the overall process of FIG. 4. However, a path will generally be selected a single time (e.g., in one of steps 316 or 416) and output a single time (e.g., in one of steps 318 or 418), and so such duplicate steps may be omitted in an actual implementation of FIG. 3 and FIG. 4. For example, if steps 316 and 318 are implemented, step 416 may be omitted and step 418 may be used to output the normalized paths to step 316 for selection.

Referring to FIG. 5A, one embodiment of a method 500 illustrates a process that may be used as step 404 of FIG. 4 to identify the offset cost of a convergence path. It is understood that this is only an example of step 404 and other methods may be used.

In step 502, the length of a path segment is identified. For purposes of example, a segment is one foot in length, but it is understood that a segment may be defined in many different ways. For example, a segment may be defined as a distance (e.g., inches, centimeters, yards, or meters) or may be defined using one or more other measurement criteria (e.g., a length of pipe or a fraction of that length). In step 504, the path is divided into segments of the identified length. For example, a four hundred foot path would be divided into four hundred segments that are each one foot in length.

In step 506, a single path segment is identified for cost calculation purposes. The present step identifies which one of the segments is to have its cost calculated in this iteration of the method 500. In step 508, the segment's distance from the target path is identified. In step 510, the segment's location on a cost curve is calculated based on distance. As described previously, this location identifies the penalty that is to be applied to the segment, with the penalty generally increasing the farther the location is from the target path.

Figure 5B:
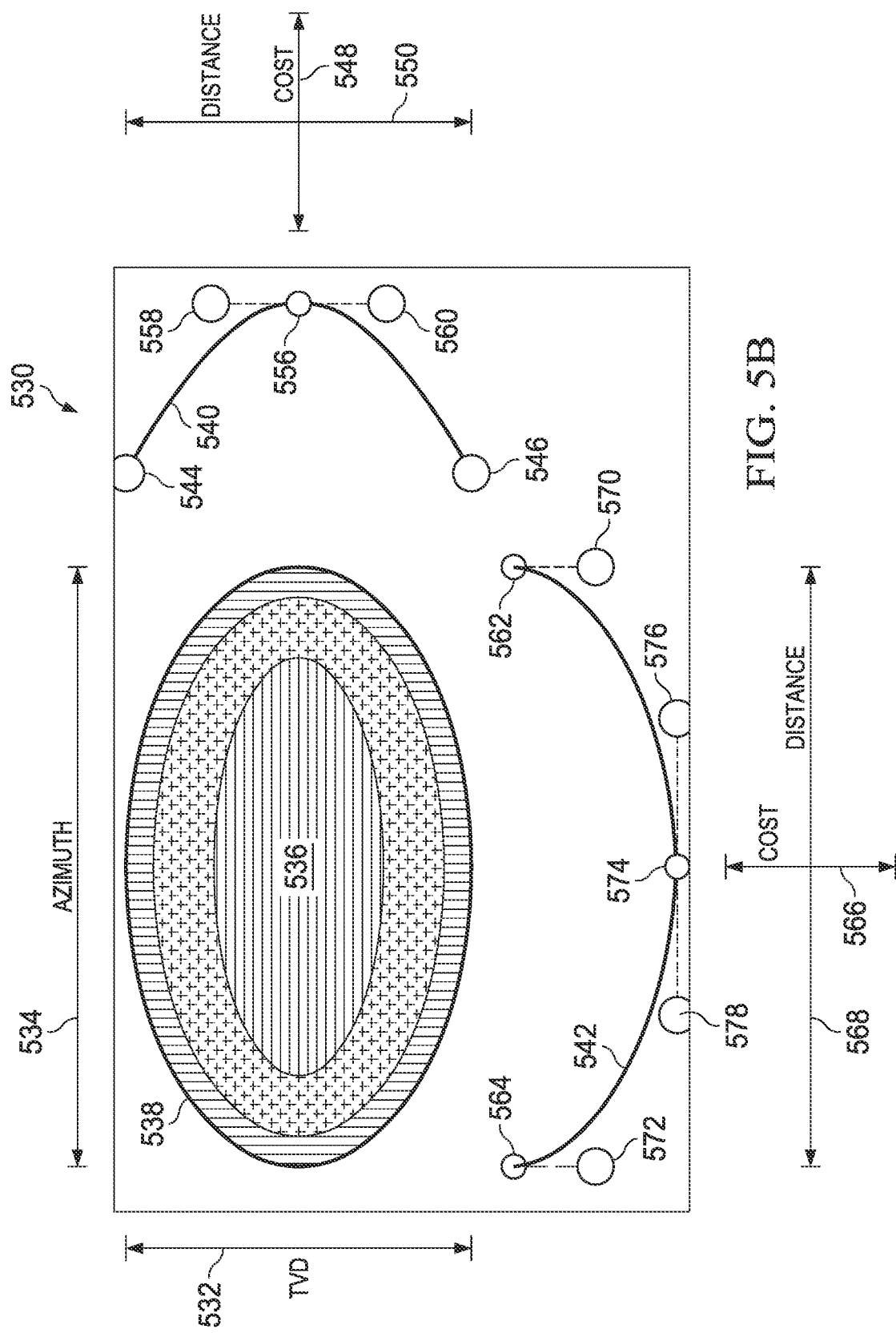
FIGS. 5B-5D illustrate embodiments of a two dimensional diagram of a cost curve.
Figure 5C:
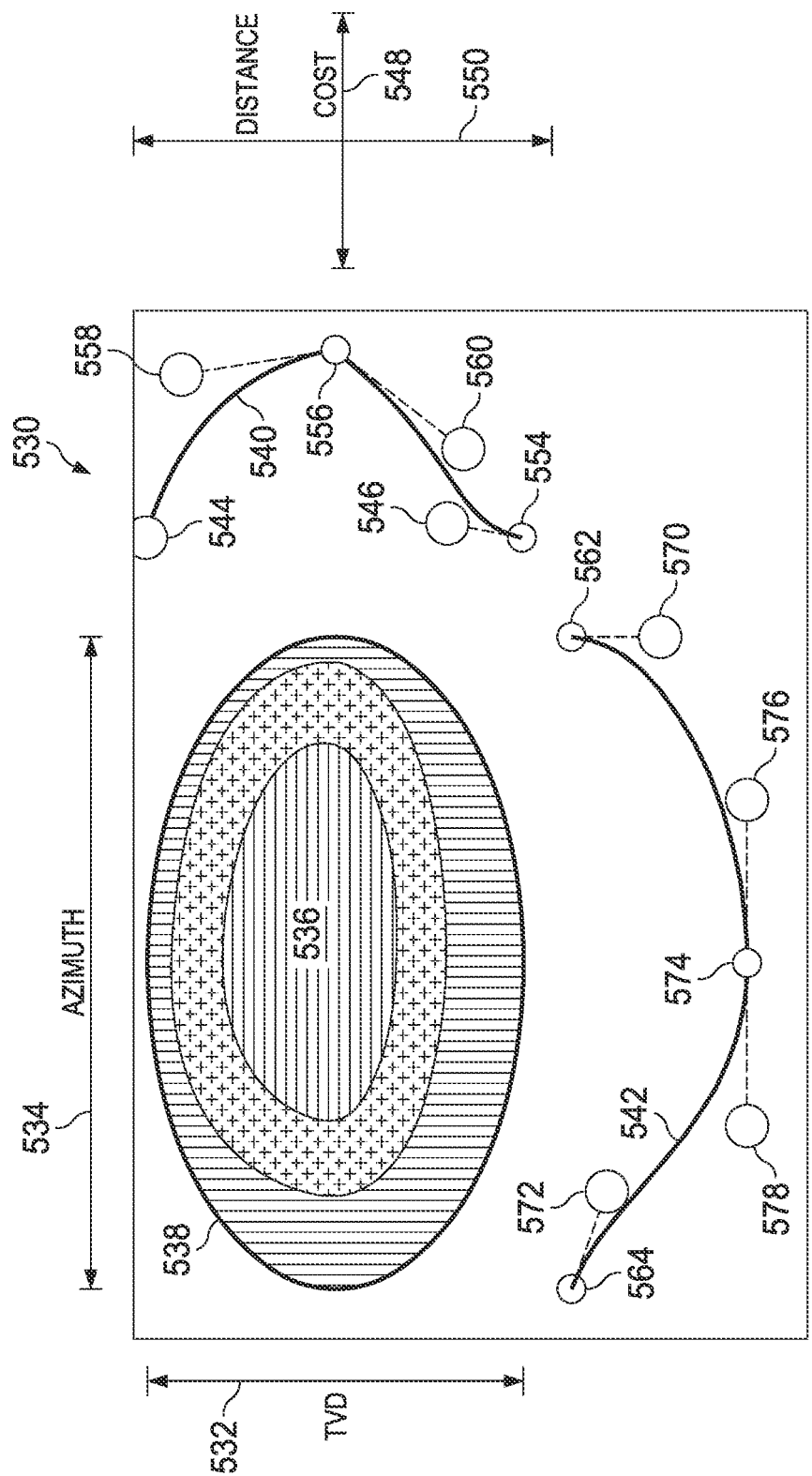
Figure 5D:
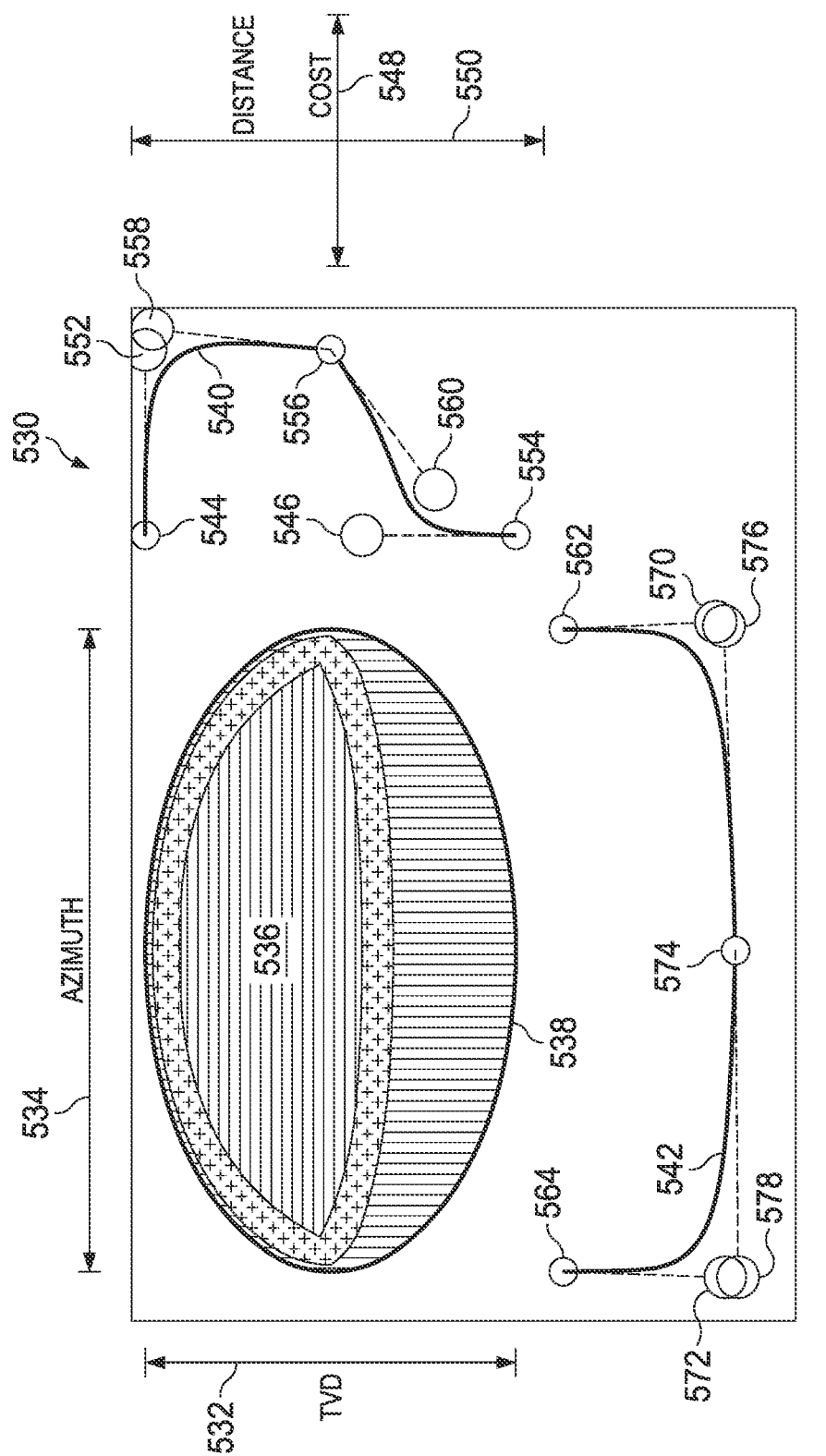

With additional reference to FIGS. 5B-D, various embodiments of a cost curve 530 are illustrated using two-dimensional diagrams. The cost curve 530 may show costs, including non-linear and/or non-symmetrical costs, against an axis 532 representing true vertical depth (TVD) and an axis 534 representing azimuth. As shown, the diagrams 530 may provide a region 536 of potential non-linear path costs surrounded by a boundary 538 that represents an outer limit of the non-linear costs. It is understood that costs may increase outside the boundary 538, but may be linear or non-linear. Without such cost increases outside the boundary, a potential solution that passes the boundary would incur no additional cost and there would be no cost pressure to return the solution to the region 536.

The region 536 may include colored and/or otherwise differentiated areas to indicate costs. For example, green (the center portion of the region 536 indicated by horizontal lines) yellow (the intermediate portion of the region 536 indicated by "+" signs), and red (the outer portion of the region 536 indicated by vertical lines) may be used to indicate areas of desirable, borderline, and undesirable costs, respectively. Shading or other indicia may be used to indicate graduated costs, such as going from a lighter red to a darker red. In addition, it is understood that the colors may not be separated by a clear line, but may fade into one another. For example, green may fade into yellow to indicate that costs are increasing, rather than having an abrupt transition from green to yellow.

In the present embodiment, the cost curve 530 may be manipulated along one or both axes 532 and 534 by modifying the location of lines 540 and 542. One or both of the lines 540 and 542 may be non-linear and/or non-symmetrical. Manipulation of the lines 540 and 542 may affect the region 536 (e.g., may shift the costs and therefore the coloration of the region) and/or the boundary 538 (e.g., may shift maximum costs limits).

For example, line 540 may be manipulated by moving points 544 and/or 546, which may be moved relative to a cost axis 548 and a distance axis 550. The points 544 and/or 546 represent the maximum cost penalty within the boundary 538. For purposes of illustration, the point 544 may be moved to a position 552 (FIG. 5D) and the point 546 may be moved to a position 554 (FIG. 5C). A portion of the line 540 is currently at position 556 and may be moved, for example, to a position 558 or a position 560.

Similarly, line 542 may be manipulated by moving points 562 and/or 564, which may be moved relative to a cost axis 566 and a distance axis 568. The points 544 and/or 546 represent the maximum cost penalty within the boundary 538. For purposes of illustration, the point 562 may be moved to a position 570 and the point 564 may be moved to a position 572. A portion of the line 542 is currently at position 574 and may be moved, for example, to a position 576 or a position 578.

In some embodiments, the cost curve 530 may be provided as a graphical tool that enables a user to manipulate the lines 540 and 542 for spatial cost assessment when determining a convergence solution. For example, a computer system (e.g., the computer system 250 of FIG. 2B) may execute one or more of the methods described herein based on the actions of a geologist who is manipulating the lines 540 and 542 via a graphical user interface. Accordingly, the geologist or other user may "drive" the BHA along a desirable path as the diagram 530 may be viewed from the perspective of the drill bit/BHA looking forward into the formation from a cost perspective. The computer system may then create a convergence plan based on how the drill bit/BHA is driven. This allows the geologist to interact visually with the described methods to create a convergence plan.

In some embodiments, areas (not shown) of extreme or even infinite cost may be defined within the region 536 to prevent solutions from entering those areas. For example, a property line that marks a drilling limit may be given an extreme or infinite cost with the cost rising sharply as the property line is approached. In another example, an old well may be avoided by marking it as an area of extreme or infinite cost, thereby using cost as an anti-collision measure. Accordingly, the behavior of solutions can be affected by defining geographic zones as areas of extreme or infinite cost and/or by controlling the rate at which the costs increase as those zones are approached.

Referring again to FIG. 5A, in step 512, the segment's cost is calculated based on the cost assigned to the segment's location on the cost curve. Continuing the previous example of the target path 104 having a value of $1000 per foot, if the segment is at the $600 mark on the cost curve, the offset cost is $400 (i.e., $1000−$400=$600) if the cost curve is defined in terms of value. If the cost curve is defined in terms of cost, the mark would indicate the $400 cost (e.g., the mark identifies the cost rather than the value). In step 514, the segment's cost is added to the path's cost (e.g., current segment cost+current path cost=new path cost).

In step 516, a determination may be made as to whether the cost of another segment of the path is to be determined.

If the cost of another segment is to be identified, the method 500 returns to step 506 and begins calculating the next segment's cost. If there are no other segments for which cost is to be identified, the method 500 continues to step 518. In step 518, the path cost is output.

With additional reference to FIG. 6, one embodiment of a method 600 illustrates a process that may be used as step 406 of FIG. 4 to identify the curvature cost of a convergence path. It is understood that this is only an example of step 406 and other methods may be used. The curvature cost addresses the costs associated with curves in the path. Such costs include reaming, casing requirements, the impact of friction on later well segments, and similar costs. The curvature cost may be viewed as a mixture of friction impact, steerage issues, and launch penalty.

The launch penalty can be in a relative zone or an absolute zone and addresses system stability. The absolute zone launch penalty addresses drilling above a certain angle (e.g., ninety-eight degrees). This is a common problem when drilling a horizontal well because moving above that angle makes it very difficult to get the well to come back down to the desired path because there is less weight pulling the BHA down (e.g., gravity is not aiding the course correction as much). Once this tipping point angle is reached, the BHA tends to move aggressively away from the plan (e.g., launches).

The relative zone launch penalty addresses the impact of geo-drift and drilling at an offset from a planned angle. When not staying on bed dip (e.g., when crossing the grain), off course movement may be accelerated. Due to this, drilling against the grain of the formation tends to create an unstable system.

The launch penalty creates an exponential cost curve as the tipping point angle is approached and passed or when cross grain drilling is needed (particularly for an extended period of time) because of the difficulty in correcting the associated problems. Accordingly, the present process applies a launch penalty for approaching angles or drilling patterns where this aggressive movement may begin. Because the launch penalty is an exponential cost curve that penalizes paths that approach undesirable situations, the cost increases exponentially the closer the path gets to the absolute or relative zones.

In step 602, rotation/sliding segments of the path may be identified. This may include identifying the lengths and locations of the rotation segments and the lengths, locations, and build rates of the sliding segments. Launch penalty costs may be applied based on build rate information. In step 604, the overall curvature of the path is identified.

In step 606, the peak curvature of the path is identified. The peak curvature is identified using a defined window (e.g., a window spanning a defined number of feet) to identify dogleg severity. As this window is moved along the path, the peak curvature is located and generally occurs when the entire window contains a slide or when the window overlaps multiple slides. It is understood that the distance defined for the window may greatly impact the identified peak curvature. For example, assume there is a five degree curve that occurs within ten feet and there is not another curve within one hundred feet. Using a sliding window spanning one hundred feet will result in a dogleg severity of 5°/100 ft. Using a sliding window spanning ten feet will result in a dogleg severity of 5°/10 ft, which appears to be a much more severe dogleg even though it is actually the same one. The peak curvature, which may be less than the threshold for dogleg severity as applied by the rules in step 308 of FIG. 3, may be identified to determine cost because the greater the peak curvature, the greater the impact on later portions of the path.

For this reason, the locations of curvature may also be identified. For example, a curve early in the well will affect the remainder of the well, while a curve near the end of the well will have far less impact on the path as a well. Accordingly, a curve early in the well may more drastically affect the cost of the remainder of the well and so may be assigned a higher cost than a curve near the end of the well. As described above, how the sample size is defined (e.g., the distance spanned by the window), may have a significant impact on how a curve is evaluated.

In step 608, a curvature cost for the path is identified based on the overall (e.g., average) curvature, peak curvature, and location(s) of curvature. In step 610, the curvature cost is output.

Referring to FIG. 7, one embodiment of a method 700 illustrates a process that may be used as step 408 of FIG. 4 to identify the time cost of a convergence path. It is understood that this is only an example of step 408 and other methods may be used.

In step 702, rotation/sliding segments of the path may be identified. This may include identifying the length of the rotation segments and the length and build rate of the sliding segments. In some embodiments, this may use information from step 602 of FIG. 6 or information from this step of the method 700 may be used with the method 600 of FIG. 6. In step 704, a time for each segment may be identified. For example, there is an ROP for sliding and an ROP for rotating, and one or both of these ROPs may change over time. In addition, there may be a setup time needed to prepare for a slide, which may include the time needed to orient the toolface and account for reactional torque in preparation for the slide. Accordingly, the total time may be calculated as ((ROP for slide*slide distance)+(ROP for rotation*rotation distance)+setup time for slide).

Empirical ROP information may be used to provide current time data. Generally, sliding segments will have higher time costs than rotation segments of the same length and the ROP and/or time may change depending on the bit's location in the well. There is a ratio of slide ROP versus rotation ROP and this ratio may change over the course of the well. For example, in the vertical portion of the well, the slide/rotation ROP may be a 4:1 ratio, while at the end of the lateral it may be a 20:1 ratio. This is empirically calculated in real time or near real time so that the cost penalty threshold may be continuously updated. Accordingly, the penalty for sliding at the end of the well may be different than the penalty for sliding at the beginning of the well and the method 700 may take this into account using the empirically calculated ROP.

In step 706, the total time for the path may be identified. This may include adding together the times calculated in step 704 or may include other calculations. In step 708, a time cost is calculated for the path based on the cost of the rig per unit time (e.g., total path time*rig cost per unit time=path cost). Rig time may include some or all costs associated with the rig, including labor costs, operating costs (e.g., fuel), material costs (e.g., pipe), and/or other costs. For example, assume that a slide segment has a setup time of ten minutes and a slide time of forty minutes, and the rig has a time cost of $75,000 per day. The segment cost would be fifty minutes times the rig cost per minute (e.g., 50 minutes*($75,000/1440 minutes)=$2604.17). This could further be divided into cost per foot and/or otherwise converted for additional comparisons and/or calculations. In step 710, the time cost is output.

Referring to FIG. 8, one embodiment of a method 800 illustrates another process that may be used as step 408 of FIG. 4 to identify the time cost of a convergence path. It is understood that this is only an example of step 408 and other methods may be used. As shown in FIG. 8, cost may be calculated per segment in step 806 and the segment costs may be added to identify the total path cost in step 808. As the steps are similar or identical to those of FIG. 7 with the exception of steps 806 and 808, FIG. 8 is not described in additional detail herein.

It will be appreciated by those skilled in the art having the benefit of this disclosure that this system and method for selecting a drilling path based on cost provides an improved process for comparing drilling paths on a cost basis and selecting the drilling path that best satisfies one or more cost parameters. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for drilling a well, the system comprising:
a drilling system comprising a drilling rig with a drill string coupled thereto and with a controller device coupled thereto, wherein the drill string includes a bottom hole assembly (BHA) at one end of the drill string and the BHA includes a drill bit;
a processor;
a memory coupled to the processor and storing a plurality of instructions executable by the processor, the plurality of instructions executable by the processor including instructions for:
receiving measurement while drilling information from the BHA located in a wellbore;
responsive to the measurement while drilling information, determining a current BHA location;
determining a future BHA location based on the current BHA location and a current trajectory of the BHA;
comparing the future BHA location to a target drilling path for the wellbore, and when the future BHA location is a predetermined distance from the target drilling path then generating a plurality of geometric convergence paths, wherein each geometric convergence path provides a convergence solution from the current BHA location toward the target drilling path;
determining a distance to drill for drilling by the BHA for each of the geometric convergence paths;
determining an overall curvature of each of the geometric convergence paths;
determining a time required for drilling each of the geometric convergence paths;
selecting one of the plurality of geometric convergence paths responsive to: the distance to drill for each of the geometric convergence paths, the overall curvature of each of the geometric convergence paths, and the time required for drilling each of the geometric convergence paths;
providing the selected one of the plurality of geometric convergence paths to the controller device,
using the controller device to provide control signals to one or more control systems of the drilling rig to drill the wellbore in accordance with the selected one of the plurality of geometric convergence paths.

2. The system of claim 1, wherein the instructions for generating a plurality of geometric convergence paths further include instructions for:
obtaining drill plan information relating to a well plan, the drill plan information including at least one of the well plan, seismic data, BHA rate of penetration (ROP), and drift information; and identifying the plurality of geometric convergence paths responsive to at least one of drill plan information.

3. The system of claim 2, wherein the instructions for generating a plurality of geometric convergence paths further include instructions for:
limiting the plurality of geometric convergence paths to a predetermined number of convergence paths.

4. The system of claim 2, wherein the instructions for generating a plurality of geometric convergence paths further include instructions for:
removing some of the plurality of geometric convergence paths to remove illogical convergence paths.

5. The system of claim 2, wherein the instructions for generating a plurality of geometric convergence paths further include instructions for:
comparing the plurality of geometric convergence paths to a predetermined rule set.

6. The system of claim 5, wherein the instructions for generating a plurality of geometric convergence paths further include instructions for:
removing a portion of the plurality of geometric convergence paths from further consideration for violating rules of the predetermined rule set.

7. The system of claim 6, wherein the rules of the predetermined rule set include one or more rules that define a threshold for maximum allowable dogleg severity.

8. The system of claim 6, wherein the rules of the predetermined rule set include one or more rules that define a threshold for a maximum allowable overall curvature.

9. The system of claim 1, wherein the instructions for selecting one of the plurality of geometric convergence paths further include instructions for:
selecting one of the plurality of geometric convergence paths responsive to geometric drift associated with the plurality of geometric convergence paths.

10. The system of claim 1, wherein the instructions for selecting one of the plurality of geometric convergence paths further include instructions for:
normalizing each of the plurality of geometric convergence paths against a longest convergence path.

11. The system of claim 1, wherein the instructions for determining an overall curvature of each of the geometric convergence paths further include instructions for:
determining a peak drill path curvature associate with drilling each of the plurality of geometric convergence paths.

12. The system of claim 1, wherein the instructions for determining the time required for drilling each of the plurality of geometric convergence paths further include instructions for:
determining a time required to for drilling a plurality of segments making up a geometric convergence path of the plurality of geometric convergence paths.

13. The system of claim 1, wherein the instructions for determining the time required for drilling each of the plurality of geometric convergence paths further include instructions for:
determining the time required for drilling each of the plurality of geometric convergence paths is responsive to a rate of penetration (ROP) for a slide, a slide distance, an ROP for rotation, a rotation distance and a setup time for the slide.

14. A method for drilling a well, the method comprising:
providing a drilling system comprising a drilling rig with a drill string coupled thereto, wherein the drill string includes a bottom hole assembly (BHA) at one end of the drill string and the BHA includes a drill bit;
providing a control system communicatively coupled to a drilling control system of the drilling system;
determining, by the control system, a current BHA location in a wellbore;
determining, by the control system, a future BHA location based on the current BHA location and a current trajectory of the BHA;
comparing, by the control system, the future BHA location to a target drilling path for the wellbore, and when the future BHA location is a predetermined distance from the target drilling path then generating, by the control system, a plurality of geometric convergence paths, wherein each geometric convergence path provides a convergence solution from the current BHA location toward the target drilling path;
determining, by the control system, a distance to drill for drilling by the BHA for each of the geometric convergence paths;
determining, by the control system, an overall curvature of each of the geometric convergence paths;
determining, by the control system, a time required for drilling each of the geometric convergence paths;
selecting, by the control system, one of the plurality of geometric convergence paths responsive to the distance to drill for each of the geometric convergence paths, the overall curvature of each of the geometric convergence paths, and the time required for drilling each of the geometric convergence paths;
providing, by the control system, the selected one of the plurality of geometric convergence paths to the drilling control system of a drilling rig; and
drilling, by the drilling control system, a wellbore in accordance with the selected one of the plurality of geometric convergence paths.

15. The method of claim 14, wherein the step of generating, by the control system, a plurality of geometric convergence paths further comprises:
obtaining, by the control system, drill plan information relating to a well plan, the drill plan information including at least one of the well plan, seismic data, BHA ROP, and drift information; and
identifying, by the control system, the plurality of geometric convergence paths responsive to at least one of drill plan information.

16. The method of claim 15, wherein the step of generating, by the control system, a plurality of geometric convergence paths further comprises:
limiting, by the control system, the plurality of geometric convergence paths to a predetermined number of convergence paths.

17. The method of claim 15, wherein the step of generating, by the control system, a plurality of geometric convergence paths further comprises the step of removing, by the control system, some of the plurality of geometric convergence paths to remove illogical convergence paths.

18. The method of claim 15, wherein the step of generating, by the control system, a plurality of geometric convergence paths further comprises comparing, by the control system, the plurality of geometric convergence paths to a predetermined rule set to remove a portion of the plurality of geometric convergence paths from further consideration for violating rules of the predetermined rule set.

19. The method of claim 18, wherein the rules of the predetermined rule set include one or more rules that define a threshold for maximum allowable dogleg severity.

20. The method of claim 18, wherein the rules of the predetermined rule set include one or more rules that define a threshold for a maximum allowable overall curvature.

21. The method of claim 14, wherein the step of selecting, by the control system, one of the plurality of geometric convergence paths is further responsive to geometric drift associated with the plurality of geometric convergence paths.

22. The method of claim 14, wherein the step of selecting, by the control system, one of the plurality of geometric convergence paths further comprises:
normalizing, by the control system, each of the plurality of geometric convergence paths against a longest convergence path.

23. The method of claim 14, wherein the step of determining, by the control system, an overall curvature of each of the geometric convergence paths further comprises the step of determining, by the control system, a peak drill path curvature associate with drilling each of the plurality of geometric convergence paths.

24. The method of claim 14, wherein the step of determining, by the control system, the time required for drilling each of the plurality of geometric convergence paths further comprises: determining, by the control system, a time required to for drilling a plurality of segments making up a geometric convergence path of the plurality of geometric convergence paths.

25. The method of claim 14, wherein the step of determining, by the control system, the time required for drilling each of the plurality of geometric convergence paths is further responsive to a rate of penetration (ROP) for a slide, a slide distance, an ROP for rotation, a rotation distance and a setup time for the slide.

* * * * *